United States Patent
Li et al.

(10) Patent No.: US 11,030,729 B2
(45) Date of Patent: Jun. 8, 2021

(54) IMAGE PROCESSING METHOD AND APPARATUS FOR ADJUSTING A DYNAMIC RANGE OF AN IMAGE

(71) Applicant: Huawei Technologies Co., Ltd., Shenzhen (CN)

(72) Inventors: Meng Li, Beijing (CN); Hai Chen, Shenzhen (CN); Jianhua Zheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 145 days.

(21) Appl. No.: 16/281,606

(22) Filed: Feb. 21, 2019

(65) Prior Publication Data

US 2019/0188837 A1 Jun. 20, 2019

Related U.S. Application Data

(63) Continuation of application No. PCT/CN2016/097375, filed on Aug. 30, 2016.

(30) Foreign Application Priority Data

Aug. 22, 2016 (WO) ................ PCT/CN2016/096294

(51) Int. Cl.
*G06T 5/00* (2006.01)
*H04N 19/85* (2014.01)
*G09G 5/00* (2006.01)

(52) U.S. Cl.
CPC .............. *G06T 5/009* (2013.01); *G09G 5/00* (2013.01); *H04N 19/85* (2014.11); *G06T 2207/10024* (2013.01); *G06T 2207/20208* (2013.01)

(58) Field of Classification Search
CPC ........ G06T 5/007–5/50; H04N 5/2355; H04N 5/355–5/3559
See application file for complete search history.

(56) References Cited

U.S. PATENT DOCUMENTS

| 2009/0290040 A1 | 11/2009 | Du et al. |
| 2014/0198226 A1* | 7/2014 | Lee .................... H04N 5/23254 348/208.1 |
| 2016/0292834 A1 | 10/2016 | Tsuru et al. |
| 2016/0358319 A1 | 12/2016 | Xu et al. |

(Continued)

FOREIGN PATENT DOCUMENTS

| CN | 101540832 A | 9/2009 |
| CN | 101707666 A | 5/2010 |

(Continued)

OTHER PUBLICATIONS

Machine Translation and Abstract of Chinese Publication No. CN101540832, Sep. 23, 2009, 21 pages.

(Continued)

*Primary Examiner* — Brian Werner
(74) *Attorney, Agent, or Firm* — Conley Rose, P.C.

(57) ABSTRACT

An image processing method and apparatus, where the method includes determining a maximum value in nonlinear primary color values of all components of each pixel of a first to-be-processed image, determining dynamic parameters of a first transfer function, converting the maximum value of each pixel into a transfer value based on the first transfer function for which the dynamic parameters are determined, calculating a ratio between the transfer value and the maximum value of each pixel, and adjusting a dynamic range for the nonlinear primary color values of all the components of each pixel based on the ratio to obtain nonlinear primary color values of all components of each corresponding pixel of a first target image.

20 Claims, 6 Drawing Sheets

(56) References Cited

U.S. PATENT DOCUMENTS

| | | | |
|---|---|---|---|
| 2017/0352137 A1* | 12/2017 | Van Der Vleuten | H04N 9/68 |
| 2019/0130542 A1* | 5/2019 | Tichelaar | G06T 5/007 |

FOREIGN PATENT DOCUMENTS

| | | | |
|---|---|---|---|
| CN | 101901475 A | 12/2010 | |
| CN | 104835131 A | 8/2015 | |
| CN | 105745914 A | 7/2016 | |
| CN | 105794216 A | 7/2016 | |
| WO | 2016017058 A1 | 2/2016 | |
| WO | 2016124942 A1 | 8/2016 | |

OTHER PUBLICATIONS

Machine Translation and Abstract of Chinese Publication No. CN101707666, May 12, 2010, 22 pages.

Machine Translation and Abstract of Chinese Publication No. CN101901475, Dec. 1, 2010, 13 pages.

Machine Translation and Abstract of Chinese Publication No. CN104835131, Aug. 12, 2015, 25 pages.

Foreign Communication From A Counterpart Application, PCT Application No. PCT/CN2016/096294, English Translation of International Search Report dated Apr. 26, 2017, 2 pages.

Foreign Communication From A Counterpart Application, PCT Application No. PCT/CN2016/096294, English Translation of lWritten Opinion dated Apr. 26, 2017, 5 pages.

Foreign Communication From A Counterpart Application, PCT Application No. PCT/CN2016/097375, English Translation of International Search Report dated May 31, 2017, 2 pages.

Foreign Communication From A Counterpart Application, PCT Application No. PCT/CN2016/097375, English Translation of Written Opinion dated May 31, 2017, 5 pages.

* cited by examiner

IMAGE PROCESSING METHOD AND APPARATUS FOR ADJUSTING A DYNAMIC RANGE OF AN IMAGE

CROSS-REFERENCE TO RELATED APPLICATIONS

This application is a continuation of International Patent Application No. PCT/CN2016/097375 filed on Aug. 30, 2016, which claims priority to International Patent Application No. PCT/CN2016/096294 filed on Aug. 22, 2016. The disclosures of the aforementioned applications are hereby incorporated by reference in their entireties.

TECHNICAL FIELD

Embodiments of the present application relate to the field of image processing, and in particular, to a processing method and apparatus for converting an image dynamic range.

BACKGROUND

An optical/digital imaging process is converting optical radiation in a real scene into an electrical signal using an image sensor, and storing the electrical signal in a form of a digital image. Image display aims to re-produce, using a display device, a real scene described by a digital image. An ultimate objective of the optical/digital imaging process and the image display is to enable a user to obtain visual perception the same as that obtained when the user directly observes the real scene.

A dynamic range is a luminance ratio between the brightest object and the darkest object in a scene, namely, a level of a grayscale division between the "brightest" and "darkest" parts of an image. A larger dynamic range indicates that a richer hierarchy can be represented. Luminance is physical measurement of light in a scene, and a unit is candela per square meter ($cd/m^2$) that may also be expressed by nits.

For a long time, image sensors all have a very small dynamic range (usually, a dynamic range of a charge-coupled device (CCD) sensor does not exceed 1000:1). However, luminance in a real scene has a very large dynamic change range, an average luminance in the scene when stars shine in the night is 0.0001 $cd/m^2$, and luminance in the scene under daytime sunlight reaches 100000 $cd/m^2$.

A high dynamic range (also referred to as HDR) image is used to describe a complete visual range in a real world scene. The HDR image can show detail information of extremely dark and extremely bright areas that may be lost by a conventional photography device but can be perceived by a human visual system. Generally, an optical signal value that is of an image and whose dynamic range is greater than 0.01 nit to 1000 nits is referred to as a high dynamic range optical signal value, and an optical signal value that is of an image and whose dynamic range is less than 0.1 nit to 400 nits is referred to as a standard dynamic range (also referred to as SDR) optical signal value.

Corresponding to an HDR signal and an SDR signal, a display capability of an HDR display device satisfies an optical signal value dynamic range of an HDR image, and supports an HDR electro-optical transfer function, and a display capability of an SDR display device satisfies an optical signal value dynamic range of an SDR image, and supports an SDR optical-electro transfer function.

To display an HDR image on an SDR display device and display an SDR image on an HDR display device, or display HDR images on HDR display devices having different HDR display capabilities, and ensure consistent display effects and avoid occurrence of problems such as a contrast change and a detail loss, a dynamic range needs to be adjusted.

An HDR-to-SDR dynamic range adjustment is used as an example. In other approaches, when an HDR image is input, and a display device is an SDR display device, the following technical solution is often used. A dynamic range is adjusted for an obtained electrical signal value of the HDR image to obtain an electrical signal value of a final SDR image. A transfer parameter used to adjust the dynamic range is related only to fixed data such as maximum or minimum luminance of the SDR display device. According to such a processing method, consistency between a display effect of the SDR image and a display effect of the HDR image cannot be effectively ensured after the dynamic range is adjusted, and problems such as a contrast change and a detail loss may occur. Consequently, the display effect of the SDR image is affected.

SUMMARY

Embodiments of the present application provide an image processing method and apparatus to effectively ensure that a probability of occurrence of problems such as a contrast change and a detail loss is reduced after a dynamic range is adjusted, thereby reducing impact on a display effect of an image.

A first aspect of the embodiments of the present application provides an image processing method, including determining a maximum value in nonlinear primary color values of all components of each pixel of a first to-be-processed image, determining dynamic parameters of a first transfer function, converting the maximum value of each pixel into a transfer value based on the first transfer function for which the dynamic parameters are determined, calculating a ratio between the transfer value and the maximum value of each pixel, and adjusting a dynamic range for the nonlinear primary color values of all the components of each pixel based on the ratio to obtain nonlinear primary color values of all components of each corresponding pixel of a first target image.

It can be learned from the foregoing descriptions that, according to the first aspect of the embodiments of the present application, the dynamic parameters instead of a fixed static parameter are used, and dynamic compression processing is performed on the image based on a first transfer curve. Compared with the other approaches in which a static parameter is used in a process of performing an adjustment of narrowing down a dynamic range for an image, in the embodiments of the present application, consistency between display effects can be effectively ensured after the dynamic range is adjusted, and a probability of occurrence of problems such as a contrast change and a detail loss is reduced, thereby reducing impact on the display effect of the image.

In a feasible implementation, adjusting a dynamic range for the nonlinear primary color values of all the components of each pixel based on the ratio includes performing an adjustment of narrowing down the dynamic range for the nonlinear primary color values of all the components of each pixel based on the ratio when an image dynamic range of the first to-be-processed image is greater than an image dynamic range of the first target image, and performing an adjustment of expanding the dynamic range for the nonlinear primary color values of all the components of each pixel based on the ratio when an image dynamic range of the first to-be-processed image is less than an image dynamic range of the first target image.

In a feasible implementation, adjusting a dynamic range for the nonlinear primary color values of all the components of each pixel based on the ratio includes calculating a product of the ratio and each of the nonlinear primary color values of all the components of each pixel to obtain nonlinear primary color values of all the components of each pixel after the adjustment.

In a feasible implementation, the component includes an R component, a G component, a B component, or a Y component.

In a feasible implementation, after obtaining nonlinear primary color values of all components of each corresponding pixel of a first target image, the method further includes converting the nonlinear primary color values of all the components of each pixel of the first target image into linear primary color values of all components of a corresponding pixel of a second target image based on a second transfer function.

In a feasible implementation, after converting the nonlinear primary color values of all the components of each pixel of the first target image into linear primary color values of all components of a corresponding pixel of a second target image, the method further includes converting the linear primary color values of all the components of the corresponding pixel of the second target image into nonlinear primary color values of all the components of the corresponding pixel of the second target image based on a third transfer function.

In a feasible implementation, before determining a maximum value in nonlinear primary color values of all components of each pixel of a first to-be-processed image, the method further includes converting linear primary color values of all components of each pixel of a second to-be-processed image into nonlinear primary color values of all components of a corresponding pixel of the first to-be-processed image based on a fourth transfer function.

In a feasible implementation, before converting linear primary color values of all components of each pixel of a second to-be-processed image into nonlinear primary color values of all components of a corresponding pixel of the first to-be-processed image, the method further includes converting nonlinear primary color values of all the components of each pixel of the second to-be-processed image into linear primary color values of all the components of the corresponding pixel of the second to-be-processed image based on a fifth transfer function.

It can be learned from the foregoing descriptions that, according to the foregoing plurality of feasible implementations, types of input and output images to which the embodiments of the present application are applicable are increased, thereby improving applicability of the solution.

In a feasible implementation, the first to-be-processed image is a high dynamic range image, and the second target image is a standard dynamic range image, the first transfer function includes an S-shaped transfer curve, the second transfer function includes a high dynamic range electro-optical transfer function, and the third transfer function includes a standard dynamic range optical-electro transfer function.

In a feasible implementation, the second to-be-processed image is a standard dynamic range image, and the first target image is a high dynamic range image, the first transfer function includes a reversed S-shaped transfer curve, the fourth transfer function includes a high dynamic range optical-electro transfer function, and the fifth transfer function includes a standard dynamic range electro-optical transfer function.

In a feasible implementation, the standard dynamic range electro-optical transfer function includes a BT.1886 electro-optical transfer function, and the standard dynamic range optical-electro transfer function includes a BT.1886 optical-electro transfer function.

In a feasible implementation, the first to-be-processed image is a first high dynamic range image, the first target image is a second high dynamic range image, and a dynamic range of the first high dynamic range image is different from a dynamic range of the second high dynamic range image, and the first transfer function includes an S-shaped transfer curve or a reversed S-shaped transfer curve.

In a feasible implementation, the second target image is a third high dynamic range image, and a high dynamic image standard with which the second high dynamic range image complies is different from a high dynamic image standard with which the third high dynamic range image complies, the second transfer function includes a high dynamic range electro-optical transfer function, and the high dynamic range electro-optical transfer function is used to convert an image that conforms to the high dynamic image standard with which the second high dynamic range image complies, and the third transfer function includes a high dynamic range optical-electro transfer function, and the high dynamic range optical-electro transfer function is used to convert an image that conforms to the high dynamic image standard with which the third high dynamic range image complies.

In a feasible implementation, the second to-be-processed image is a fourth high dynamic range image, and a high dynamic image standard with which the first high dynamic range image complies is different from a high dynamic image standard with which the fourth high dynamic range image complies, the fifth transfer function includes a high dynamic range electro-optical transfer function, and the high dynamic range electro-optical transfer function is used to convert an image that conforms to the high dynamic image standard with which the fourth high dynamic range image complies, and the fourth transfer function includes a high dynamic range optical-electro transfer function, and the high dynamic range optical-electro transfer function is used to convert an image that conforms to the high dynamic image standard with which the first high dynamic range image complies.

In a feasible implementation, the high dynamic range electro-optical transfer function includes a perceptual quantizer (PQ) electro-optical transfer function, a Hybrid Log-Gamma (HLG) electro-optical transfer function, or a scene luminance fidelity (SLF) electro-optical transfer function.

In a feasible implementation, the high dynamic range optical-electro transfer function includes a PQ optical-electro transfer function, an HLG optical-electro transfer function, or an SLF optical-electro transfer function.

It can be learned from the foregoing descriptions that, according to the foregoing plurality of feasible implementations, types of input and output images to which the embodiments of the present application are applicable are increased, thereby improving applicability of the solution.

In a feasible implementation, the first to-be-processed image belongs to a first to-be-processed image sequence, the first target image belongs to a first target image sequence, and the determining dynamic parameters of a first transfer function includes obtaining the dynamic parameters based on at least one of the following information statistics of the first to-be-processed image or statistics of the first to-beprocessed image sequence, a first reference value of a range of the first to-be-processed image or a first reference value of a range of the first to-be-processed image sequence, a second reference value of a range of the first to-be-processed image or a second reference value of a range of the first to-be-processed image sequence, a first reference value of a range of the first target image or a first reference value of a range of the first target image sequence, or a second reference value of a range of the first target image or a second reference value of a range of the first target image sequence.

In a feasible implementation, the statistics of the first to-be-processed image or the statistics of the first to-be-processed image sequence includes at least one of the following information, a maximum value, a minimum value, an average value, a standard deviation, and histogram distribution information of a nonlinear primary color value or a linear primary color value of at least one component of a pixel of the first to-be-processed image or the first to-be-processed image sequence.

In a feasible implementation, the first reference value of the range of the first to-be-processed image or the first reference value of the range of the first to-be-processed image sequence includes a maximum luminance value of a display device configured to display the first to-be-processed image, or a first list lookup value obtained by searching a first preset list based on the statistics of the first to-be-processed image or the statistics of the first to-be-processed image sequence, or a first preset value.

In a feasible implementation, the second reference value of the range of the first to-be-processed image or the second reference value of the range of the first to-be-processed image sequence includes a minimum luminance value of a display device configured to display the first to-be-processed image, or a second list lookup value obtained by searching a second preset list based on the statistics of the first to-be-processed image or the statistics of the first to-be-processed image sequence, or a second preset value.

In a feasible implementation, the first reference value of the range of the first target image or the first reference value of the range of the first target image sequence includes a maximum luminance value of a display device configured to display the first target image, or a third preset value.

In a feasible implementation, the second reference value of the range of the first target image or the second reference value of the range of the first target image sequence includes a minimum luminance value of a display device configured to display the first target image, or a fourth preset value.

It can be learned from the foregoing descriptions that, according to the foregoing plurality of feasible implementations, more dynamic parameters can be selected, and a more suitable dynamic parameter can be obtained, thereby improving performance of the solution.

In a feasible implementation, the S-shaped transfer curve is a curve whose slope increases initially and then decreases.

In a feasible implementation, the S-shaped transfer curve includes one or more sections of curves.

In a feasible implementation, a form of the S-shaped transfer curve is as follows:

$$L' = a * \left(\frac{p*L}{(p-1)*L}\right)^m + b,$$

where L is the maximum value in the nonlinear primary color values of all the components of each pixel of the first to-be-processed image, L' is the transfer value, and the parameters a, b, p, and m are dynamic parameters of the S-shaped transfer curve.

In a feasible implementation, the parameters p and m are obtained by searching a third preset list based on statistics of the first to-be-processed image or statistics of an image sequence to which the first to-be-processed image belongs, and the parameters a and b are obtained through calculation using the following formulas:

$$L'_1 = a * \left(\frac{p*L_1}{(p-1)*L_1+1}\right)^m + b; \text{ and}$$

$$L'_2 = a * \left(\frac{p*L_2}{(p-1)*L_2+1}\right)^m + b,$$

where $L_1$ is a first reference value of a range of the first to-be-processed image or a first reference value of a range of the image sequence to which the first to-be-processed image belongs, $L_2$ is a second reference value of the range of the first to-be-processed image or a second reference value of the range of the image sequence to which the first to-be-processed image belongs, $L'_1$ is a first reference value of a range of the first target image or a first reference value of a range of a first target image sequence, and $L'_2$ is a second reference value of the range of the first target image or a second reference value of the range of the first target image sequence.

In a feasible implementation, a form of the S-shaped transfer curve consists of the following two functions, when $L_0 \leq L \leq L_1$, a value of L' is calculated using the following formula:

$$L'=(2t^3-3t^2+1)L'_0+(t^3-2t^2+t)(L_1-L_0)k_0+(-2t^3+3t^2)L'_1+(t^3-t^2)(L_1-L_0)k_1,$$

where $$t = \frac{L-L_0}{L_1-L_0},$$

and when $L_1 < L \leq L_2$, a value of L' is calculated using the following formula:

$$L'=(2t^3-3t^2+1)L'_1+(t^3-2t^2+t)(L_2-L_1)k_1+(-2t^3+3t^2)L'_2+(t^3-t^2)(L_2-L_1)k_2,$$

where $$t = \frac{L-L_1}{L_2-L_1},$$

and L is the maximum value in the nonlinear primary color values of all the components of each pixel of the first to-be-processed image, and L' is the transfer value, and $L_0$, $L_1$, $L_2$, $L'_0$, $L'_1$, $L'_2$, $k_0$, $k_1$, and $k_2$ are dynamic parameters of the S-shaped transfer curve, $L_0$, $L'_0$, and $k_0$ respectively indicate an input value, an output value, and a slope of a start point of a first section of curve, $L_1$, $L'_1$, and $k_1$ respectively indicate an input value, an output value, and a slope of a connection point between the first section of curve and a second section of curve, $L_2$, $L'_2$, and $k_2$ respectively indicate an input value, an output value, and a slope of an end point of the second section of curve, and $k_0$, $k_1$, and $k_2$ satisfy that $k_0 < k_1$ and $k_1 > k_2$.

In a feasible implementation, $L_0$ is a first reference value of a range of the first to-be-processed image or a first reference value of a range of a first to-be-processed image sequence, $L_2$ is a second reference value of the range of the first to-be-processed image or a second reference value of the range of the first to-be-processed image sequence, $L'_0$ is a first reference value of a range of the first target image or a first reference value of a range of a first target image sequence, and $L'_2$ is a second reference value of the range of the first target image or a second reference value of the range of the first target image sequence, and the parameters $L_1$, $L'_1$, $k_1$, and $k_2$ are obtained by searching a fourth preset list based on statistics of the first to-be-processed image or statistics of the first to-be-processed image sequence.

In a feasible implementation, $L_0$ is a first reference value of a range of the first to-be-processed image or a first reference value of a range of a first to-be-processed image sequence, $L_2$ is a second reference value of the range of the first to-be-processed image or a second reference value of the range of the first to-be-processed image sequence, $L'_0$ is a first reference value of a range of the first target image or a first reference value of a range of a first target image sequence, and $L'_2$ is a second reference value of the range of the first target image or a second reference value of the range of the first target image sequence, the parameters $L_1$, $k_0$, $k_1$, and $k_2$ are obtained by searching a fifth preset list based on statistics of the first to-be-processed image or statistics of the first to-be-processed image sequence, and the parameter $L'_1$ is obtained through calculation using the following formula:

$$L'_1 = \sqrt{L_1 \times \sqrt{L'_0 \times L'_2}}.$$

It can be learned from the foregoing descriptions that, according to the foregoing plurality of feasible implementations, the S-shaped transfer curve is provided as the first transfer function, thereby improving implementability of the solution.

In a feasible implementation, the reversed S-shaped transfer curve is a curve whose slope decreases initially and then increases.

In a feasible implementation, the reversed S-shaped transfer curve includes one or more sections of curves.

In a feasible implementation, a form of the reversed S-shaped transfer curve is as follows:

$$L' = \frac{1}{p \times \left(\frac{L-b}{a}\right)^{-\frac{1}{m}} - p + 1},$$

where $L$ is the maximum value in the nonlinear primary color values of all the components of each pixel of the first to-be-processed image, $L'$ is the transfer value, and the parameters $a$, $b$, $p$, and $m$ are dynamic parameters of the reversed S-shaped transfer curve.

In a feasible implementation, the parameters $p$ and $m$ are obtained by searching a sixth preset list, and the parameters $a$ and $b$ are calculated using the following formulas:

$$L'_1 = \frac{1}{p \times \left(\frac{L_1-b}{a}\right)^{-\frac{1}{m}} - p + 1}; \text{ and}$$

$$L'_2 = \frac{1}{p \times \left(\frac{L_2-b}{a}\right)^{-\frac{1}{m}} - p + 1},$$

where $L_1$ is a first reference value of a range of the first to-be-processed image or a first reference value of a range of the image sequence to which the first to-be-processed image belongs, $L_2$ is a second reference value of the range of the first to-be-processed image or a second reference value of the range of the image sequence to which the first to-be-processed image belongs, $L'_1$ is a first reference value of a range of the first target image or a first reference value of a range of a first target image sequence, and $L'_2$ is a second reference value of the range of the first target image or a second reference value of the range of the first target image sequence.

In a feasible implementation, a form of the reversed S-shaped transfer curve consists of the following two functions, when $L_0 \leq L \leq L_1$, a value of $L'$ is calculated using the following formula:

$$L' = (2t^3 - 3t^2 + 1)L'_0 + (t^3 - 2t^2 + t)(L_1 - L_0)k_0 + (-2t^3 + 3t^2)L'_1 + (t^3 - t^2)(L_1 - L_0)k_1,$$

where $$t = \frac{L - L_0}{L_1 - L_0},$$

and when $L_1 < L \leq L_2$, a value of $L'$ is calculated using the following formula:

$$L' = (2t^3 - 3t^2 + 1)L'_1 + (t^3 - 2t^2 + t)(L_2 - L_1)k_1 + (-2t^3 + 3t^2)L'_2 + (t^3 - t^2)(L_2 - L_1)k_2,$$

where $$t = \frac{L - L_1}{L_2 - L_1},$$

and $L$ is the maximum value in the nonlinear primary color values of all the components of each pixel of the first to-be-processed image, and $L'$ is the transfer value, and $L_0$, $L_1$, $L_2$, $L'_0$, $L'_1$, $L'_2$, $k_0$, $k_1$, and $k_2$ are dynamic parameters of the S-shaped transfer curve, $L_0$, $L'_0$, and $k_0$ respectively indicate an input value, an output value, and a slope of a start point of a first section of curve, $L_1$, $L'_1$, and $k_1$ respectively indicate an input value, an output value, and a slope of a connection point between the first section of curve and a second section of curve, $L_2$, $L'_2$, and $k_2$ respectively indicate an input value, an output value, and a slope of an end point of the second section of curve, and $k_0$, $k_1$, and $k_2$ satisfy that $k_0 > k_1$ and $k_1 < k_2$.

In a feasible implementation, $L_0$ is a first reference value of a range of the first to-be-processed image or a first reference value of a range of a first to-be-processed image sequence, $L_2$ is a second reference value of the range of the first to-be-processed image or a second reference value of the range of the first to-be-processed image sequence, $L'_0$ is a first reference value of a range of the first target image or a first reference value of a range of a first target image sequence, and $L'_2$ is a second reference value of the range of the first target image or a second reference value of the range of the first target image sequence, and the parameters $L_1$, $L'_1$, $k_0$, $k_1$, and $k_2$ are obtained by searching a seventh preset list based on statistics of the first to-be-processed image or statistics of the first to-be-processed image sequence.

In a feasible implementation, $L_0$ is a first reference value of a range of the first to-be-processed image or a first reference value of a range of a first to-be-processed image sequence, $L_2$ is a second reference value of the range of the first to-be-processed image or a second reference value of the range of the first to-be-processed image sequence, $L'_0$ is a first reference value of a range of the first target image or a first reference value of a range of a first target image sequence, and $L'_2$ is a second reference value of the range of the first target image or a second reference value of the range of the first target image sequence, the parameters $L_1$, $k_0$, $k_1$, and $k_2$ are obtained by searching an eighth preset list based on statistics of the first to-be-processed image or statistics of the first to-be-processed image sequence, and the parameter $L'_1$ is obtained through calculation using the following formula:

$$L'_1 = \sqrt{L_1 \times \sqrt{L'_0 \times L'_2}}.$$

It can be learned from the foregoing descriptions that, according to the foregoing plurality of feasible implementations, the S-shaped transfer curve is provided as the first transfer function, thereby improving implementability of the solution.

A second aspect of the embodiments of the present application provides an image processing apparatus, including a first determining module configured to determine a maximum value in nonlinear primary color values of all components of each pixel of a first to-be-processed image, a second determining module configured to determine dynamic parameters of a first transfer function, a first conversion module configured to convert the maximum value of each pixel into a transfer value based on the first transfer function for which the dynamic parameters are determined, a calculation module configured to calculate a ratio between the transfer value and the maximum value of each pixel, and an adjustment module configured to adjust a dynamic range for the nonlinear primary color values of all the components of each pixel based on the ratio, to obtain nonlinear primary color values of all components of each corresponding pixel of a first target image.

It should be understood that, solution implementation of the second aspect of the embodiments of the present application and feasible implementations of the second aspect is consistent with solution implementation of the first aspect of the embodiments of the present application and the corresponding implementations, and beneficial effects are not described again.

In a feasible implementation, the adjustment module is further configured to perform an adjustment of narrowing down the dynamic range for the nonlinear primary color values of all the components of each pixel based on the ratio when an image dynamic range of the first to-be-processed image is greater than an image dynamic range of the first target image, and perform an adjustment of expanding the dynamic range for the nonlinear primary color values of all the components of each pixel based on the ratio when an image dynamic range of the first to-be-processed image is less than an image dynamic range of the first target image.

In a feasible implementation, the adjustment module is further configured to calculate a product of the ratio and each of the nonlinear primary color values of all the components of each pixel to obtain nonlinear primary color values of all the components of each pixel after the adjustment.

In a feasible implementation, the component includes an R component, a G component, a B component, or a Y component.

In a feasible implementation, the apparatus further includes a second conversion module configured to convert the nonlinear primary color values of all the components of each pixel of the first target image into linear primary color values of all components of a corresponding pixel of a second target image based on a second transfer function.

In a feasible implementation, the apparatus further includes a third conversion module configured to convert the linear primary color values of all the components of the corresponding pixel of the second target image into nonlinear primary color values of all the components of the corresponding pixel of the second target image based on a third transfer function.

In a feasible implementation, the apparatus further includes a fourth conversion module configured to convert linear primary color values of all components of each pixel of a second to-be-processed image into nonlinear primary color values of all components of a corresponding pixel of the first to-be-processed image based on a fourth transfer function.

In a feasible implementation, the apparatus further includes a fifth conversion module configured to convert nonlinear primary color values of all the components of each pixel of the second to-be-processed image into linear primary color values of all the components of the corresponding pixel of the second to-be-processed image based on a fifth transfer function.

In a feasible implementation, the first to-be-processed image is a high dynamic range image, and the second target image is a standard dynamic range image, the first transfer function includes an S-shaped transfer curve, the second transfer function includes a high dynamic range electro-optical transfer function, and the third transfer function includes a standard dynamic range optical-electro transfer function.

In a feasible implementation, the second to-be-processed image is a standard dynamic range image, and the first target image is a high dynamic range image, the first transfer function includes a reversed S-shaped transfer curve, the fourth transfer function includes a high dynamic range optical-electro transfer function, and the fifth transfer function includes a standard dynamic range electro-optical transfer function.

In a feasible implementation, the standard dynamic range electro-optical transfer function includes a BT.1886 electro-optical transfer function, and the standard dynamic range optical-electro transfer function includes a BT.1886 optical-electro transfer function.

In a feasible implementation, the first to-be-processed image is a first high dynamic range image, the first target image is a second high dynamic range image, and a dynamic range of the first high dynamic range image is different from a dynamic range of the second high dynamic range image, and the first transfer function includes an S-shaped transfer curve or a reversed S-shaped transfer curve.

In a feasible implementation, the second target image is a third high dynamic range image, and a high dynamic image standard with which the second high dynamic range image complies is different from a high dynamic image standard with which the third high dynamic range image complies, the second transfer function includes a high dynamic range electro-optical transfer function, and the high dynamic range electro-optical transfer function is used to convert an image that conforms to the high dynamic image standard with which the second high dynamic range image complies, and the third transfer function includes a high dynamic range optical-electro transfer function, and the high dynamic range optical-electro transfer function is used to convert an image that conforms to the high dynamic image standard with which the third high dynamic range image complies.

In a feasible implementation, the second to-be-processed image is a fourth high dynamic range image, and a high dynamic image standard with which the first high dynamic range image complies is different from a high dynamic image standard with which the fourth high dynamic range image complies, the fifth transfer function includes a high dynamic range electro-optical transfer function, and the high dynamic range electro-optical transfer function is used to convert an image that conforms to the high dynamic image standard with which the fourth high dynamic range image complies, and the fourth transfer function includes a high dynamic range optical-electro transfer function, and the high dynamic range optical-electro transfer function is used to convert an image that conforms to the high dynamic image standard with which the first high dynamic range image complies.

In a feasible implementation, the high dynamic range electro-optical transfer function includes a PQ electro-optical transfer function, an HLG electro-optical transfer function, or an SLF electro-optical transfer function.

In a feasible implementation, the high dynamic range optical-electro transfer function includes a PQ optical-electro transfer function, an HLG optical-electro transfer function, or an SLF optical-electro transfer function.

In a feasible implementation, the first to-be-processed image belongs to a first to-be-processed image sequence, the first target image belongs to a first target image sequence, and the first conversion module is further configured to obtain the dynamic parameters based on at least one of the following information of statistics of the first to-be-processed image or statistics of the first to-be-processed image sequence, a first reference value of a range of the first to-be-processed image or a first reference value of a range of the first to-be-processed image sequence, a second reference value of a range of the first to-be-processed image or a second reference value of a range of the first to-be-processed image sequence, a first reference value of a range of the first target image or a first reference value of a range of the first target image sequence, or a second reference value of a range of the first target image or a second reference value of a range of the first target image sequence.

In a feasible implementation, the statistics of the first to-be-processed image or the statistics of the first to-be-processed image sequence includes at least one of the following information of a maximum value, a minimum value, an average value, a standard deviation, and histogram distribution information of a nonlinear primary color value or a linear primary color value of at least one component of a pixel of the first to-be-processed image or the first to-be-processed image sequence.

In a feasible implementation, the first reference value of the range of the first to-be-processed image or the first reference value of the range of the first to-be-processed image sequence includes a maximum luminance value of a display device configured to display the first to-be-processed image, a first list lookup value obtained by searching a first preset list based on the statistics of the first to-be-processed image or the statistics of the first to-be-processed image sequence, or a first preset value.

In a feasible implementation, the second reference value of the range of the first to-be-processed image or the second reference value of the range of the first to-be-processed image sequence includes a minimum luminance value of a display device configured to display the first to-be-processed image, a second list lookup value obtained by searching a second preset list based on the statistics of the first to-be-processed image or the statistics of the first to-be-processed image sequence, or a second preset value.

In a feasible implementation, the first reference value of the range of the first target image or the first reference value of the range of the first target image sequence includes a maximum luminance value of a display device configured to display the first target image, or a third preset value.

In a feasible implementation, the second reference value of the range of the first target image or the second reference value of the range of the first target image sequence includes a minimum luminance value of a display device configured to display the first target image, or a fourth preset value.

In a feasible implementation, the S-shaped transfer curve is a curve whose slope increases initially and then decreases.

In a feasible implementation, the S-shaped transfer curve includes one or more sections of curves.

In a feasible implementation, a form of the S-shaped transfer curve is as follows:

$$L' = a * \left(\frac{p * L}{(p-1) * L}\right)^m + b,$$

where L is the maximum value in the nonlinear primary color values of all the components of each pixel of the first to-be-processed image, L' is the transfer value, and the parameters a, b, p, and m are dynamic parameters of the S-shaped transfer curve.

In a feasible implementation, the parameters p and m are obtained by searching a third preset list based on statistics of the first to-be-processed image or statistics of an image sequence to which the first to-be-processed image belongs, and the parameters a and b are obtained through calculation using the following formulas:

$$L'_1 = a * \left(\frac{p * L_1}{(p-1) * L_1 + 1}\right)^m + b; \text{ and}$$

$$L'_2 = a * \left(\frac{p * L_2}{(p-1) * L_2 + 1}\right)^m + b,$$

where $L_1$ is a first reference value of a range of the first to-be-processed image or a first reference value of a range of the image sequence to which the first to-be-processed image belongs, $L_2$ is a second reference value of the range of the first to-be-processed image or a second reference value of the range of the image sequence to which the first to-be-processed image belongs, $L'_1$ is a first reference value of a range of the first target image or a first reference value of a range of a first target image sequence, and $L'_2$ is a second reference value of the range of the first target image or a second reference value of the range of the first target image sequence.

In a feasible implementation, a form of the S-shaped transfer curve consists of the following two functions, when $L_0 \leq L \leq L_1$, a value of L' is calculated using the following formula:

$$L'=(2t^3-3t^2+1)L'_0+(t^3-2t^2+t)(L_1-L_0)k_0+(-2t^3+3t^2)L'_1+(t^3-t^2)(L_1-L_0)k_1,$$

where $$t = \frac{L - L_0}{L_1 - L_0},$$

and when $L_1 < L \leq L_2$, a value of L' is calculated using the following formula:

$$L' = (2t^3 - 3t^2 + 1)L'_1 + (t^3 - 2t^2 + t)(L_2 - L_1)k_1 + (2t^3 + 3t^2)L'_2 + (t^3 - t^2)(L_2 - L_1)k_2,$$

where $$t = \frac{L - L_1}{L_2 - L_1},$$

and L is the maximum value in the nonlinear primary color values of all the components of each pixel of the first to-be-processed image, and L' is the transfer value, and $L_0$, $L_1$, $L_2$, $L'_0$, $L'_1$, $L'_2$, $k_0$, $k_1$, and $k_2$ are dynamic parameters of the S-shaped transfer curve, $L_0$, $L'_0$, and $k_0$ respectively indicate an input value, an output value, and a slope of a start point of a first section of curve, $L_1$, $L'_1$, and $k_1$ respectively indicate an input value, an output value, and a slope of a connection point between the first section of curve and a second section of curve, $L_2$, $L'_2$, and $k_2$ respectively indicate an input value, an output value, and a slope of an end point of the second section of curve, and $k_0$, $k_1$, and $k_2$ satisfy that $k_0 < k_1$ and $k_1 > k_2$.

In a feasible implementation, $L_0$ is a first reference value of a range of the first to-be-processed image or a first reference value of a range of a first to-be-processed image sequence, $L_2$ is a second reference value of the range of the first to-be-processed image or a second reference value of the range of the first to-be-processed image sequence, $L'_0$ is a first reference value of a range of the first target image or a first reference value of a range of a first target image sequence, and $L'_2$ is a second reference value of the range of the first target image or a second reference value of the range of the first target image sequence, and the parameters $L_1$, $L'_1$, $k_0$, $k_1$, and $k_2$ are obtained by searching a fourth preset list based on statistics of the first to-be-processed image or statistics of the first to-be-processed image sequence.

In a feasible implementation, $L_0$ is a first reference value of a range of the first to-be-processed image or a first reference value of a range of a first to-be-processed image sequence, $L_2$ is a second reference value of the range of the first to-be-processed image or a second reference value of the range of the first to-be-processed image sequence, $L'_0$ is a first reference value of a range of the first target image or a first reference value of a range of a first target image sequence, and $L'_2$ is a second reference value of the range of the first target image or a second reference value of the range of the first target image sequence, the parameters $L_1$, $k_0$, $k_1$, and $k_2$ are obtained by searching a fifth preset list based on statistics of the first to-be-processed image or statistics of the first to-be-processed image sequence, and the parameter $L'_1$ is obtained through calculation using the following formula:

$$L'_1 = \sqrt{L_1 \times \sqrt{L'_0 \times L'_2}}.$$

In a feasible implementation, the reversed S-shaped transfer curve is a curve whose slope decreases initially and then increases.

In a feasible implementation, the reversed S-shaped transfer curve includes one or more sections of curves.

In a feasible implementation, a form of the reversed S-shaped transfer curve is as follows:

$$L' = \frac{1}{p \times \left(\frac{L - b}{a}\right)^{-\frac{1}{m}} - p + 1},$$

where L is the maximum value in the nonlinear primary color values of all the components of each pixel of the first to-be-processed image, L' is the transfer value, and the parameters a, b, p, and m are dynamic parameters of the reversed S-shaped transfer curve.

In a feasible implementation, the parameters p and m are obtained by searching a sixth preset list, and the parameters a and b are calculated using the following formulas:

$$L'_1 = \frac{1}{p \times \left(\frac{L_1 - b}{a}\right)^{-\frac{1}{m}} - p + 1}; \text{ and}$$

$$L'_2 = \frac{1}{p \times \left(\frac{L_2 - b}{a}\right)^{-\frac{1}{m}} - p + 1},$$

where $L_1$ is a first reference value of a range of the first to-be-processed image or a first reference value of a range of the image sequence to which the first to-be-processed image belongs, $L_2$ is a second reference value of the range of the first to-be-processed image or a second reference value of the range of the image sequence to which the first to-be-processed image belongs, $L'_1$ is a first reference value of a range of the first target image or a first reference value of a range of a first target image sequence, and $L'_2$ is a second reference value of the range of the first target image or a second reference value of the range of the first target image sequence.

In a feasible implementation, a form of the reversed S-shaped transfer curve consists of the following two functions, when $L_0 \leq L \leq L_1$, a value of L' is calculated using the following formula:

$$L' = (2t^3 - 3t^2 + 1)L'_0 + (t^3 - 2t^2 + t)(L_1 - L_0)k_0 + (-2t^3 + 3t^2)L'_1 + (t^3 - t^2)(L_1 - L_0)k_1,$$

where $$t = \frac{L - L_0}{L_1 - L_0},$$

and when $L_1 < L \leq L_2$, a value of L' is calculated using the following formula:

$$L' = (2t^3 - 3t^2 + 1)L'_1 + (t^3 - 2t^2 + t)(L_2 - L_1)k_1 + (-2t^3 + 3t^2)L'_2 + (t^3 - t^2)(L_2 - L_1)k_2,$$

where $$t = \frac{L - L_1}{L_2 - L_1},$$

and L is the maximum value in the nonlinear primary color values of all the components of each pixel of the first to-be-processed image, and L' is the transfer value, and $L_0$, $L_1$, $L_2$, $L'_0$, $L'_1$, $L'_2$, $k_0$, $k_1$, and $k_2$ are dynamic parameters of the S-shaped transfer curve, $L_0$, $L'_0$, and $k_0$ respectively indicate an input value, an output value, and a slope of a start point of a first section of curve, $L_1$, $L'_1$, and $k_1$ respectively indicate an input value, an output value, and a slope of a connection point between the first section of curve and a second section of curve, $L_2$, $L'_2$, and $k_2$ respectively indicate an input value, an output value, and a slope of an end point of the second section of curve, and $k_0$, $k_1$, and $k_2$ satisfy that $k_0 > k_1$ and $k_1 < k_2$.

In a feasible implementation, $L_0$ is a first reference value of a range of the first to-be-processed image or a first reference value of a range of a first to-be-processed image sequence, $L_2$ is a second reference value of the range of the first to-be-processed image or a second reference value of the range of the first to-be-processed image sequence, $L'_0$ is a first reference value of a range of the first target image or a first reference value of a range of a first target image sequence, and $L'_2$ is a second reference value of the range of the first target image or a second reference value of the range of the first target image sequence, and the parameters $L_1$, $L'_1$, $k_0$, $k_1$, and $k_2$ are obtained by searching a seventh preset list based on statistics of the first to-be-processed image or statistics of the first to-be-processed image sequence.

In a feasible implementation, $L_0$ is a first reference value of a range of the first to-be-processed image or a first reference value of a range of a first to-be-processed image sequence, $L_2$ is a second reference value of the range of the first to-be-processed image or a second reference value of the range of the first to-be-processed image sequence, $L'_0$ is a first reference value of a range of the first target image or a first reference value of a range of a first target image sequence, and $L'_2$ is a second reference value of the range of the first target image or a second reference value of the range of the first target image sequence, the parameters $L_1$, $k_0$, $k_1$, and $k_2$ are obtained by searching an eighth preset list based on statistics of the first to-be-processed image or statistics of the first to-be-processed image sequence, and the parameter $L'_1$ is obtained through calculation using the following formula:

$$L'_1 = \sqrt{L_1 \times \sqrt{L'_0 \times L'_2}}.$$

A third aspect of the embodiments of the present application provides an image processing method. The method is used to process an HDR image into an SDR image. In the method, first, a maximum value in electrical signal values of all components of each pixel of the HDR image is determined, dynamic parameters of an S-shaped transfer curve are obtained, the maximum value in the electrical signal values of all the components of each pixel of the HDR image is converted using the obtained dynamic parameters based on the S-shaped transfer curve, to obtain a transfer value of each pixel, where the S-shaped transfer curve is a function for converting a maximum value in electrical signal values of all components of any pixel of the HDR image based on the dynamic parameters, after the maximum value and the transfer value that correspond to each pixel are obtained, a ratio between the maximum value and the transfer value that correspond to each pixel is calculated, an adjustment of narrowing down a dynamic range is performed for all the components of each pixel of the HDR image based on the calculated ratio, where the S-shaped curve indicates a curve whose curve shape is an "S" shape, namely, a curve whose curve slope increases initially and then decreases, next, target image information, namely, image information including the electrical signal values of all the components of each pixel of the HDR image for which the adjustment of narrowing down the dynamic range is performed, is converted based on an HDR electro-optical transfer function, to obtain optical signal values of all components of each pixel of the SDR image, and finally, the optical signal values of all the components of each pixel of the SDR image are converted based on an SDR optical-electro transfer function, to obtain electrical signal values of all the components of each pixel of the SDR image.

It can be learned from the foregoing descriptions that, according to the third aspect of the embodiments of the present application, the HDR image is processed into the SDR image. In a process of processing the HDR image into the SDR image, the dynamic parameters instead of a fixed static parameter are used, and dynamic compression processing is performed on the image based on the S-shaped transfer curve. Compared with the other approaches in which a static parameter is used in a process of performing an adjustment of narrowing down a dynamic range for an image, in the embodiments of the present applications, consistency between a display effect of the SDR image and a display effect of the HDR image can be effectively ensured after the dynamic range is adjusted, and a probability of occurrence of problems such as a contrast change and a detail loss is reduced, thereby reducing impact on the display effect of the image.

In a feasible implementation, the HDR image belongs to an HDR image sequence, the SDR image belongs to an SDR image sequence, and obtaining dynamic parameters of an S-shaped transfer curve includes obtaining the dynamic parameters based on at least one of the following information of statistics of the HDR image or statistics of the HDR image sequence, a first reference value of a range of the HDR image or a first reference value of a range of the HDR image sequence, a second reference value of a range of the HDR image or a second reference value of a range of the HDR image sequence, a first reference value of a range of the SDR image or a first reference value of a range of the SDR image sequence, or a second reference value of a range of the SDR image or a second reference value of a range of the SDR image sequence.

To be specific, in this implementation, the dynamic parameters of the S-shaped transfer curve are obtained based on at least one of the foregoing information, thereby improving implementability of the solution.

In a feasible implementation, the statistics of the HDR image includes at least one of the following information of a maximum value, a minimum value, an average value, a standard deviation, and histogram distribution information of an electrical signal value of at least one component of a pixel of the HDR image or the HDR image sequence.

To be specific, in this implementation, specific statistics of the HDR image or specific statistics of the HDR image sequence is provided, thereby improving diversity and implementability of the solution.

In a feasible implementation, the component includes an R component, a G component, a B component, or a Y component.

In a feasible implementation, the first reference value of the range of the HDR image or the first reference value of the range of the HDR image sequence may be, but is not limited to, a maximum luminance value of a reference HDR display device, or a first list lookup value obtained by searching a first preset list based on the statistics of the HDR image or the statistics of the HDR image sequence, or a first preset value.

In a feasible implementation, the second reference value of the range of the HDR image or the second reference value of the range of the HDR image sequence may be, but is not limited to, a minimum luminance value of a reference HDR display device, a second list lookup value obtained by searching a second preset list based on the statistics of the HDR image or the statistics of the HDR image sequence, or a second preset value.

In a feasible implementation, the first reference value of the range of the SDR image or the first reference value of the range of the SDR image sequence may be, but is not limited to, a maximum luminance value of a reference SDR display device, or a third preset value.

The second reference value of the range of the SDR image or the second reference value of the range of the SDR image sequence may be, but is not limited to, a minimum luminance value of a reference SDR display device, or a fourth preset value.

To be specific, in the foregoing implementations, some preferred values of the first reference value of the range of the HDR image or the first reference value of the range of the HDR image sequence, the second reference value of the range of the HDR image or the second reference value of the range of the HDR image sequence, the first reference value of the range of the SDR image or the first reference value of the range of the SDR image sequence, and the second reference value of the range of the SDR image or the second reference value of the range of the SDR image sequence are provided, thereby improving implementability of the solution.

In a feasible implementation, the S-shaped transfer curve may be a curve whose slope increases initially and then decreases.

In a feasible implementation, with reference to the foregoing embodiments, the S-shaped transfer curve may be a curve that includes one or more sections of curves and whose slope increases initially and then decreases.

In this implementation, a curve slope trend of the S-shaped transfer curve in the embodiments of the present application is provided.

In a feasible implementation, a form of the S-shaped transfer curve uses a curve form corresponding to the following formula:

$$L' = a*\left(\frac{p*L}{(p-1)*L}\right)^m + b,$$

where, in the foregoing formula, L is the maximum value in the electrical signal values of all the components of each pixel of the HDR image, L' is an output value, namely, the transfer value obtained after L is substituted into the foregoing formula, and the parameters a, b, p, and m are the dynamic parameters of the S-shaped transfer curve.

In this implementation, a form of the S-shaped transfer curve is provided, thereby improving implementability of the solution.

With reference to the foregoing embodiment, in a feasible implementation, the parameters p and m are parameters obtained by searching a third preset list, the parameters a and b are obtained through calculation by solving a system of equations, and the system of equations is shown as follows:

$$L'_1 = a*\left(\frac{p*L_1}{(p-1)*L_1+1}\right)^m + b;\text{ and}$$

$$L'_2 = a*\left(\frac{p*L_2}{(p-1)*L_2+1}\right)^m + b,$$

where $L_1$ is a first reference value of a range of the HDR image or a first reference value of a range of an HDR image sequence, $L_2$ is a second reference value of the range of the HDR image or a second reference value of the range of the HDR image sequence, $L'_1$ is a first reference value of a range of the SDR image or a first reference value of a range of an SDR image sequence, and $L'_2$ is a second reference value of the range of the SDR image or a second reference value of the range of the SDR image sequence.

To be specific, in this implementation, with reference to a specific form of the S-shaped transfer curve, a manner of obtaining the dynamic parameters of the S-shaped transfer curve is provided, thereby improving implementability of the solution.

In a feasible implementation, a form of the S-shaped transfer curve may use a curve form corresponding to the following two functions, when $L_0 \leq L \leq L_1$, a value of L' is calculated using the following formula:

$$L' = (2t^3-3t^2+1)L'_0 + (t^3-2t^2+t)(L_1-L_0)k_0 + (-2t^3+3t^2)L'_1 + (t^3-t^2)(L_1-L_0)k_1,$$

where $$t = \frac{L-L_0}{L_1-L_0},$$

and when $L_1 < L \leq L_2$, a value of L' is calculated using the following formula:

$$L' = (2t^3-3t^2+1)L'_1 + (t^3-2t^2+t)(L_2-L_1)k_1 + (-2t^3+3t^2)L'_2 + (t^3-t^2)(L_2-L_1)k_2,$$

where $$t = \frac{L-L_1}{L_2-L_1},$$

and for ease of understanding, the parameters in the foregoing piecewise functions are described below. L is the maximum value in the electrical signal values of all the components of each pixel of the HDR image, and L' is the transfer value corresponding to each pixel and obtained after the maximum value in the electrical signal values of all the components of each pixel is substituted into the foregoing formula, $L_0$, $L_1$, $L_2$, $L'_0$, $L'_1$, $L'_2$, $k_0$, $k_1$, and $k_2$ are the dynamic parameters of the S-shaped transfer curve, $L_0$, $L'_0$, and $k_0$ respectively indicate an input value, an output value, and a slope of a start point of a first section of curve, $L_1$, $L'_1$, and $k_1$ respectively indicate an input value, an output value, and a slope of a connection point between the first section of curve and a second section of curve, $L_2$, $L'_2$, and $k_2$ respectively indicate an input value, an output value, and a slope of an end point of the second section of curve, and $k_0$, $k_1$, and $k_2$ satisfy that $k_0 < k_1 > k_2$.

To be specific, in this implementation, another specific form of the S-shaped transfer curve is provided, thereby improving implementability and diversity of the solution.

In a feasible implementation, $L_0$ is a first reference value of a range of the HDR image or a first reference value of a range of an HDR image sequence, $L_2$ is a second reference value of the range of the HDR image or a second reference value of the range of the HDR image sequence, $L'_0$ is a first reference value of a range of the SDR image or a first reference value of a range of an SDR image sequence, $L'_2$ is a second reference value of the range of the SDR image or a second reference value of the range of the SDR image sequence, and the parameters $L_1$, $L'_1$, $k_1$, and $k_2$ are obtained by searching a fourth preset list based on statistics of the HDR image or statistics of the HDR image sequence.

To be specific, in this implementation, with reference to the foregoing specific S-shaped transfer curve, a manner of obtaining the dynamic parameters of the S-shaped transfer curve is provided.

In a feasible implementation, $L_0$ is a first reference value of a range of the HDR image or a first reference value of a range of an HDR image sequence, $L_2$ is a second reference value of the range of the HDR image or a second reference value of the range of the HDR image sequence, $L'_0$ is a first reference value of a range of the SDR image or a first reference value of a range of an SDR image sequence, $L'_2$ is a second reference value of the range of the SDR image or a second reference value of the range of the SDR image sequence, to be specific, a manner of obtaining the parameters $L_0$, $L'_0$, $L'_2$, and $L_2$ is the same as that in the foregoing implementation, and the parameters $L_1$, $k_0$, $k_1$, and $k_2$ are obtained by searching a fourth preset list based on statistics of the HDR image or statistics of the HDR image sequence, to be specific, a manner of obtaining the parameters $L_1$, $k_0$, $k_1$, $k_2$ is also the same as that in the foregoing implementation, but the parameter $L'_1$ is different from $L'_1$ in the foregoing implementation, and in this implementation, the parameter $L'_1$ is obtained through calculation using the following formula:

$$L'_1 = \sqrt{L_1 \times \sqrt{L'_0 \times L'_2}}.$$

To be specific, in this implementation, another manner of obtaining the parameter $L_1$ is provided, thereby improving diversity of the solution.

In a feasible implementation, the performing an adjustment of narrowing down a dynamic range for all the components of each pixel based on the ratio between the maximum value and the transfer value may be multiplying the ratio by the electrical signal values of all the components of each pixel to obtain electrical signal values of all components of any pixel after the adjustment of narrowing down the dynamic range.

To be specific, in this implementation, a specific manner of performing the adjustment of narrowing down the dynamic range is provided, thereby improving implementability of the solution.

A fourth aspect of the embodiments of the present application provides an image processing method. The method is used to process an SDR image into an HDR image. In the method, electrical signal values of all components of all pixels of the SDR image are obtained, to be specific, electrical signal values of all components of each pixel of the SDR image are obtained, dynamic parameters of a reversed S-shaped transfer curve are obtained, next, electrical-to-optical conversion is performed on the electrical signal values of all the components of each pixel of the SDR image based on an SDR electro-optical transfer function to obtain optical signal values corresponding to all the components of each pixel of the SDR image, then, optical-to-electrical conversion is performed on the optical signal values of all the components of each pixel of the SDR image based on an HDR optical-electro transfer function, to obtain target image information, namely, corresponding electrical signal values obtained after the optical signal values of all the components of the SDR image are converted based on the HDR optical-electro transfer function, where the reversed S-shaped curve indicates a curve whose curve shape is a reversed "S" shape, namely, a curve whose curve slope decreases initially and then increases, a maximum value in the electrical signal values of all the components of each pixel of the target image information is determined, conversion processing is performed on the maximum value based on the reversed S-shaped transfer curve, to obtain a transfer value, where the reversed S-shaped transfer curve is a function for converting the maximum value based on the dynamic parameters, subsequently, a ratio between the transfer value of each pixel of the target image information and the corresponding maximum value is calculated, and an adjustment of expanding a dynamic range is performed for the electrical signal values of all the components of the corresponding pixel of the target image information based on the ratio of each pixel of the target image information, to obtain electrical signal values of all components of each pixel of the HDR image after the adjustment of expanding the dynamic range.

It can be learned from the foregoing descriptions that, according to the fourth aspect of the embodiments of the present application, the method for processing an SDR image into an HDR image is provided. In a process of processing the SDR image into the HDR image, similarly, the dynamic parameters instead of a fixed static parameter are used, and dynamic stretching processing is performed on the image based on the reversed S-shaped transfer curve. Compared with the other approaches in which a static parameter is used in a process of performing an adjustment of expanding a dynamic range for an image, in the embodiments of the present applications, consistency between a display effect of the SDR image and a display effect of the HDR image can be effectively ensured after the dynamic range is adjusted, and a probability of occurrence of problems such as a contrast change and a detail loss is reduced, thereby reducing impact on the display effect of the image.

In a feasible implementation, the SDR image belongs to an SDR image sequence, the HDR image belongs to an HDR image sequence, and the obtaining dynamic parameters of a reversed S-shaped transfer curve includes obtaining the dynamic parameters based on at least one of the following information of statistics of the SDR image or statistics of the SDR image sequence, a first reference value of a range of the SDR image or a first reference value of a range of the SDR image sequence, a second reference value of a range of the SDR image or a second reference value of a range of the SDR image sequence, a first reference value of a range of the HDR image or a first reference value of a range of the HDR image sequence, or a second reference value of a range of the HDR image or a second reference value of a range of the HDR image sequence.

To be specific, in this implementation, the dynamic parameters of the reversed S-shaped transfer curve are obtained based on at least one of the foregoing information. Certainly, in addition to the information listed above, the dynamic parameters of the reversed S-shaped transfer curve may be obtained based on other information, thereby improving implementability and diversity of the solution.

In a feasible implementation, the statistics of the SDR image includes at least one of the following information of a maximum value, a minimum value, an average value, a standard deviation, and histogram distribution information of an electrical signal value of at least one component of a pixel of the SDR image or the SDR image sequence.

To be specific, in this implementation, specific statistics of the SDR image or specific statistics of the SDR image sequence is provided, thereby improving diversity and implementability of the solution.

In a feasible implementation, the component includes an R component, a G component, a B component, or a Y component.

In a feasible implementation, the first reference value of the range of the HDR image or the first reference value of the range of the HDR image sequence may be, but is not limited to, a maximum luminance value of a reference HDR display device, or a first preset value, and the second reference value of the range of the HDR image or the second reference value of the range of the HDR image sequence may be, but is not limited to, a minimum luminance value of a reference HDR display device, or a second preset value.

In a feasible implementation, the second reference value of the range of the SDR image or the second reference value of the range of the SDR image sequence may be, but is not limited to, a maximum luminance value of a reference SDR display device, or a third list lookup value obtained by searching a fifth preset list based on the statistics of the SDR image or the statistics of the SDR image sequence, or a third preset value.

In a feasible implementation, the second reference value of the range of the SDR image or the second reference value of the range of the SDR image sequence may be, but is not limited to, a minimum luminance value of a reference SDR display device, a third list lookup value obtained by searching a sixth preset list based on the statistics of the SDR image or the statistics of the SDR image sequence, or a fourth preset value.

To be specific, in the foregoing implementations, some preferred values of the first reference value of the range of the SDR image or the first reference value of the range of the SDR image sequence, the second reference value of the range of the SDR image or the second reference value of the range of the SDR image sequence, the first reference value of the range of the HDR image or the first reference value of the range of the HDR image sequence, and the second reference value of the range of the HDR image or the second reference value of the range of the HDR image sequence are provided, thereby improving implementability of the solution.

In a feasible implementation, the reversed S-shaped transfer curve is a curve whose slope decreases initially and then increases.

In a feasible implementation, the reversed S-shaped transfer curve includes one or more sections of curves.

In a feasible implementation, a form of the reversed S-shaped transfer curve uses a curve form corresponding to the following formula:

$$L' = \frac{1}{p \times \left(\frac{L-b}{a}\right)^{-\frac{1}{m}} - p + 1},$$

where, in the foregoing formula, L is the maximum value in the electrical signal values of all the components of each pixel of the target image information, L' is the transfer value, and the parameters a, b, p, and m are the dynamic parameters of the reversed S-shaped transfer curve.

In this implementation, further, a form of the reversed S-shaped transfer curve is provided, thereby improving implementability of the solution.

In a feasible implementation, the parameters p and m are parameters obtained by searching a seventh preset list, and the parameters a and b are obtained through calculation using the following system of equations:

$$L'_1 = \frac{1}{p \times \left(\frac{L_1-b}{a}\right)^{-\frac{1}{m}} - p + 1}; \text{ and}$$

$$L'_2 = \frac{1}{p \times \left(\frac{L_2-b}{a}\right)^{-\frac{1}{m}} - p + 1},$$

where, in the foregoing system of equations, $L_1$ is a first reference value of a range of the SDR image or a first reference value of a range of an SDR image sequence, $L_2$ is a second reference value of the range of the SDR image or a second reference value of the range of the SDR image sequence, $L'_1$ is a first reference value of a range of the HDR image or a first reference value of a range of an HDR image sequence, and $L'_2$ is a second reference value of the range of the HDR image or a second reference value of the range of the HDR image sequence.

To be specific, in this implementation, with reference to a specific form of the reversed S-shaped transfer curve, a manner of obtaining the dynamic parameters of the reversed S-shaped transfer curve is provided, thereby improving implementability of the solution.

In a feasible implementation, a form of the reversed S-shaped transfer curve may use a curve form corresponding to the following two functions, when $L_0 \leq L \leq L_1$, a value of L' is calculated using the following formula:

$$L'=(2t^3-3t^2+1)L'_0+(t^3-2t^2+t)(L_1-L_0)k_0+(-2t^3+3t^2)L'_1+(t^3-t^2)(L_1-L_0)k_1,$$

where $$t = \frac{L-L_0}{L_1-L_0},$$

and when $L_1 < L \leq L_2$, a value of L' is calculated using the following formula:

$$L'=(2t^3-3t^2+1)L'_1+(t^3-2t^2+t)(L_2-L_1)k_1+(-2t^3+3t^2)L'_2+(t^3-t^2)(L_2-L_1)k_2,$$

where $$t = \frac{L-L_1}{L_2-L_1},$$

and L is the maximum value in the electrical signal values of all the components of each pixel of the target image information, and L' is the transfer value, and $L_0$, $L_1$, $L_2$, $L'_0$, $L'_1$, $L'_2$, $k_0$, $k_1$, and $k_2$ are the dynamic parameters of the reversed S-shaped transfer curve, $L_0$, $L'_0$, and $k_0$ respectively indicate an input value, an output value, and a slope of a start point of a first section of curve, $L_1$, $L'_1$, and $k_1$ respectively indicate an input value, an output value, and a slope of a connection point between the first section of curve and a second section of curve, $L_2$, $L'_2$, and $k_2$ respectively indicate an input value, an output value, and a slope of an end point of the second section of curve, and $k_0$, $k_1$, and $k_2$ satisfy that $k_0 > k_1 < k_2$.

In this implementation, another specific form of the reversed S-shaped transfer curve is provided, thereby improving implementability and diversity of the solution.

In a feasible implementation, with reference to the foregoing form of the reversed S-shaped transfer curve, $L_0$ is a first reference value of a range of the SDR image or a first reference value of a range of an SDR image sequence, $L_2$ is a second reference value of the range of the SDR image or a second reference value of the range of the SDR image sequence, $L'_0$ is a first reference value of a range of the HDR image or a first reference value of a range of an HDR image sequence, $L'_2$ is a second reference value of the range of the HDR image or a second reference value of the range of the HDR image sequence, and $L_1$, $L'_1$, $k_0$, $k_1$, and $k_2$ are obtained by searching an eighth preset list based on statistics of the SDR image or statistics of the SDR image sequence.

To be specific, in this implementation, with reference to the foregoing specific reversed S-shaped transfer curve, a manner of obtaining the dynamic parameters of the reversed S-shaped transfer curve is provided.

In a feasible implementation, $L_0$ is a first reference value of a range of the SDR image or a first reference value of a range of an SDR image sequence, $L_2$ is a second reference value of the range of the SDR image or a second reference value of the range of the SDR image sequence, $L'_0$ is a first reference value of a range of the HDR image or a first reference value of a range of an HDR image sequence, $L'_2$ is a second reference value of the range of the HDR image or a second reference value of the range of the HDR image sequence, the parameters $L_1$, $k_0$, $k_1$, and $k_2$ are obtained by searching an eighth preset list based on statistics of the HDR image or statistics of the HDR image sequence, and the parameter $L'_1$ is obtained through calculation using the following formula:

$$L'_1 = \sqrt{L_1 \times \sqrt{L'_0 \times L'_2}}.$$

To be specific, in this implementation, compared with the foregoing implementation, another manner of obtaining the parameter $L_1$ is provided, thereby improving diversity of the solution.

In a feasible implementation, the performing an adjustment of expanding a dynamic range for the electrical signal values of all the components of the corresponding pixel of the target image information based on the ratio of each pixel of the target image information is further multiplying the ratio of each pixel of the target image information by the electrical signal values of all the components of the corresponding pixel of the target image information, to finally obtain electrical signal values of all components of each pixel of the HDR image after the adjustment of expanding the dynamic range.

A fifth aspect of the embodiments of the present application provides a computer storage medium. The computer storage medium stores program code, and the program code is used to instruct to perform the methods according to the first aspect, the third aspect, and the fourth aspect.

A sixth aspect of the embodiments of the present application provides an image processing apparatus, including a processor and a memory coupled to the processor. The processor is configured to perform the methods according to the first aspect, the third aspect, and the fourth aspect.

It can be learned from the foregoing technical solutions that, the embodiments of the present application provide the image processing method. In the process of adjusting the dynamic range, a fixed static parameter is no longer used such that the consistency between the display effects of images can be effectively ensured after the dynamic range is adjusted, and the probability of occurrence of the problems such as a contrast change and a detail loss is reduced, thereby reducing impact on the display effect of the image.

BRIEF DESCRIPTION OF DRAWINGS

To describe the technical solutions in some of the embodiments of the present application more clearly, the following briefly describes the accompanying drawings describing the embodiments. The accompanying drawings in the following description show merely some embodiments of the present application, and persons of ordinary skill in the art may still derive other drawings from these accompanying drawings without creative efforts.

DESCRIPTION OF EMBODIMENTS

Embodiments of the present application provide an image processing method and apparatus, to effectively ensure consistency between display effects after a dynamic range is adjusted, and reduce a probability of occurrence of problems such as a contrast change and a detail loss, thereby reducing impact on a display effect of an image.

To make persons skilled in the art understand the technical solutions in the present application better, the following clearly describes the technical solutions in the embodiments of the present application with reference to the accompanying drawings in the embodiments of the present application. The described embodiments are merely a part rather than all of the embodiments of the present application. All other embodiments obtained by persons of ordinary skill in the art based on the embodiments of the present application without creative efforts shall fall within the protection scope of the present application.

In the specification, claims, and accompanying drawings of the present application, the terms "first", "second", "third", "fourth", and so on (if any) are intended to distinguish between similar objects but do not necessarily indicate a specific order or sequence. It should be understood that the data termed in such a way are interchangeable in proper circumstances such that the embodiments described herein can be implemented in other orders than the order illustrated or described herein. Moreover, the terms "include" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

Figure 1:
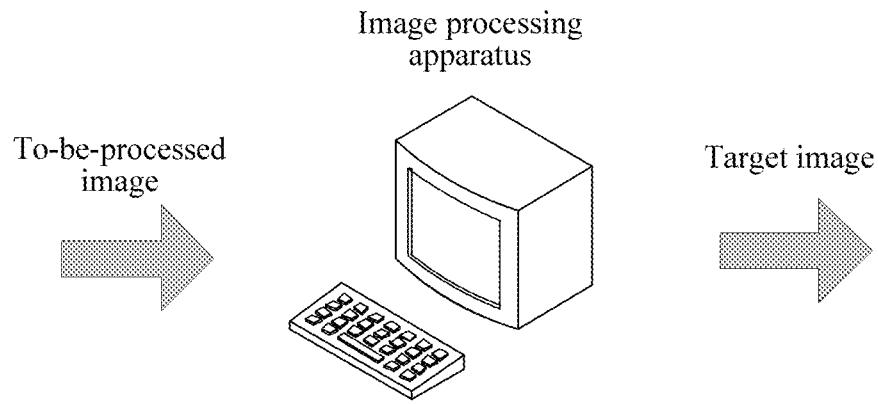
FIG. 1 is a schematic diagram of an application scenario in which an embodiment is used for image processing according to the embodiments of the present application.

It can be learned from the foregoing descriptions, existing images include images having two dynamic ranges, an SDR image and an HDR image, and display devices include an HDR display device and an SDR display device that have different display capabilities. To implement compatible display of images on the SDR display device and the HDR display devices that have different display capabilities, and effectively ensure consistency between display effects of the images, to be specific, avoid occurrence of problems such as a contrast change and a detail loss, thereby reducing impact on the display effect of the image, an embodiment of the present application provides an image processing method. In an image conversion process, a fixed static parameter is no longer used. Instead, image conversion is implemented using a preset transfer curve based on dynamic parameters, and images having different dynamic ranges are better compatible with display devices having different display capabilities. For example, consistency between a display effect of an SDR image on an SDR display device after a dynamic range is adjusted and a display effect of an HDR image on an HDR display device before the dynamic range is adjusted is kept, and impact on the display effect of the image obtained through conversion is reduced. FIG. 1 shows a common application scenario of the image processing method. An image processing apparatus may perform specified image processing on an input to-be-processed image, and output a processed target image.

First, some physical concepts used in the embodiments of the present application are described and explained.

A pixel is a basic unit of an image. A color of a pixel is usually described using several (for example, three) relatively independent attributes. These independent attributes are combined to naturally form a spatial coordinate system, that is, a color space. In the embodiments of the present application, an independent attribute for forming a pixel is referred to as a component of each pixel. For example, a component may be an image color component, for example, an R component, a G component, a B component, or a Y component. A value corresponding to a particular image color component is referred to as a primary color value of the component. A primary color value exists in different forms, for example, a linear primary color value and a nonlinear primary color value. The linear primary color value is proportional to light intensity, is normalized to [0, 1], and is also referred to as an optical signal value. 1 indicates highest display luminance, and 1 has different meanings when different transfer functions are used. For example, when a PQ transfer function is used, 1 indicates highest display luminance that is 10000 nits. For example, when an SLF transfer function is used, 1 indicates highest display luminance that is 10000 nits. For example, when an HLG transfer function is used, 1 indicates highest display luminance that is 2000 nits. For example, when a BT.1886 transfer function is used, for example, 1 generally indicates highest display luminance that is 300 nits. The nonlinear primary color value is a normalized numerical expression value of image information, has a value normalized to [0, 1], and is also referred to as an electrical signal value. There is a conversion relationship between the linear primary color value and the nonlinear primary color value. For example, an optical-electro transfer function (also referred to as OETF) may be used to convert the linear primary color value into the nonlinear primary color value, and an electro-optical transfer function (also referred to as EOTF) may be used to convert the nonlinear primary color value into the linear primary color value.

A common SDR optical-electro transfer function includes an International Telecommunication Union-Radio communication Sector (ITU-R) BT.1886 optical-electro transfer function, and correspondingly, an SDR electro-optical transfer function includes an ITU-R BT.1886 electro-optical transfer function. A common HDR optical-electro transfer function may further include, but is not limited to the following function a PQ optical-electro transfer function, an HLG optical-electro transfer function, or an SLF optical-electro transfer function, and correspondingly, an HDR electro-optical transfer function may include, but is not limited to the following function, a PQ electro-optical transfer function, an HLG electro-optical transfer function, or an SLF electro-optical transfer function.

The foregoing different optical-electro/electro-optical transfer functions are respectively provided in different high dynamic range image solutions. For example, the PQ optical-electro/electro-optical transfer function (also referred to as a PQ transfer curve) is defined in the SMPTE2084 standard, and the HLG optical-electro/electro-optical transfer function (also referred to as an HLG transfer curve) is defined in a high dynamic image standard jointly provided by the BBC and the NHK. It should be understood that, for example, an image converted using the PQ transfer curve complies with the SMPTE2084 standard, and an image converted using the HLG transfer curve complies with the HLG standard.

In addition, in the embodiments of the present application, for example, data obtained through conversion using the PQ transfer curve is referred to as an optical/electrical signal value in a PQ domain, data obtained through conversion using the HLG transfer curve is referred to as an optical/electrical signal value in an HLG domain, and data obtained through conversion using an SLF transfer curve is referred to as an optical/electrical signal value in an SLF domain.

An image processing method provided in this application is described in detail below using a specific embodiment.

Figure 2:
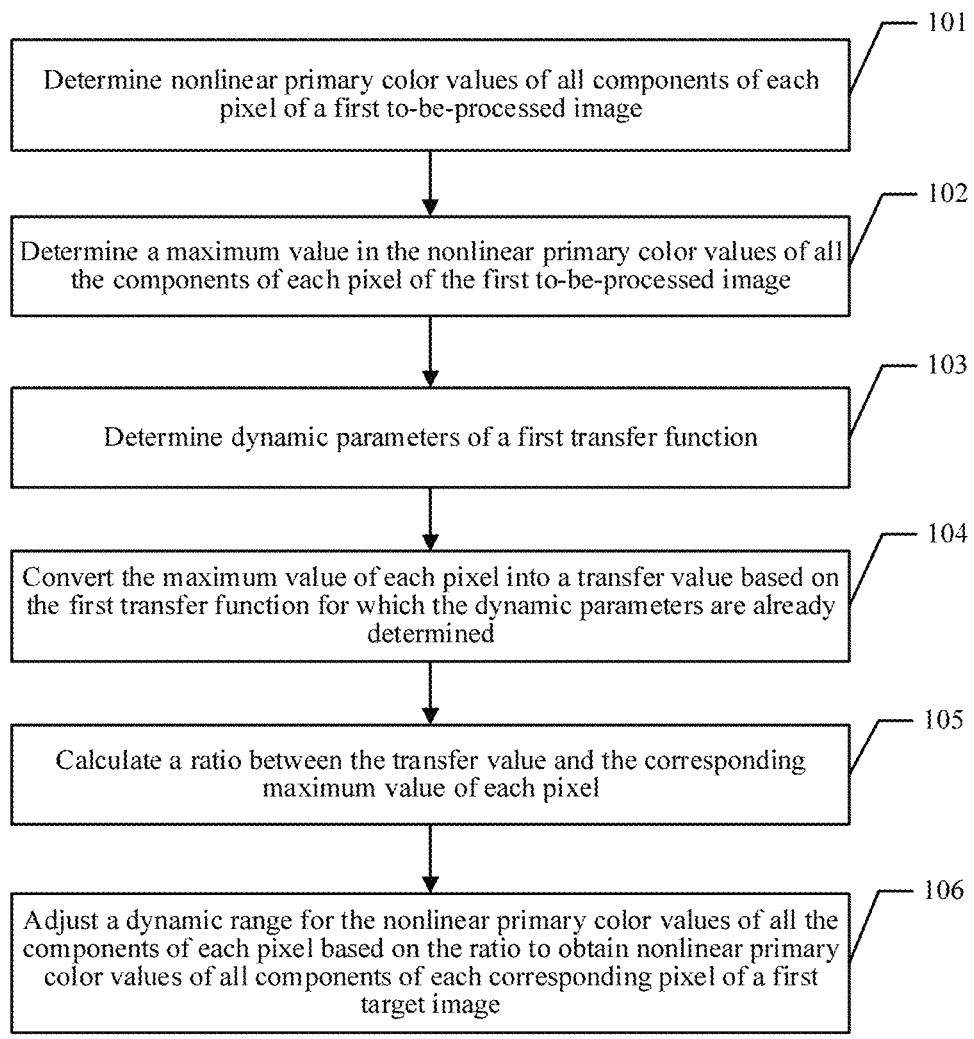
FIG. 2 is a schematic flowchart of an embodiment of an image processing method according to the embodiments of the present application.

FIG. 2 is a schematic flowchart of Embodiment 10 of an image processing method according to the embodiments of the present application. The method includes the following steps.

Step 101: Determine nonlinear primary color values of all components of each pixel of a first to-be-processed image.

In this embodiment, all the components of each pixel of the first to-be-processed image are luminance related components in the pixel.

The first to-be-processed image may be an image in a particular color space, for example, may be an image in an RGB color space or a YUV or YCrCb color space.

It should be understood that, the color spaces listed above are merely examples for description herein, and are not intended to limit a type of a color space of the obtained first to-be-processed image in this application, and may be another color space. This is not limited herein. For ease of understanding, cases in which the first to-be-processed image is in different color spaces are described below.

In a feasible implementation, when the first to-be-processed image is an image in the RGB color space, all the components of each pixel of the image include an R component, a G component, and a B component. Persons skilled in the art may learn that, the R component, the G component, and the B component are used to represent luminance of color components of the image. Therefore, the determining nonlinear primary color values of all components of each pixel of a first to-be-processed image is that nonlinear primary color values of the R component, the G component, and the B component of each pixel of the first to-be-processed image may be obtained.

In a feasible implementation, when the first to-be-processed image is an image in the RGB color space, a Y component of each pixel of the first to-be-processed image may be obtained through calculation using the R, G, and B components, for example, $Y=a_{11}*R+a_{12}*G+a_{13}*B$, where $a_{11}$, $a_{12}$, and $a_{13}$ are weighting factors. Persons skilled in the art can understand that, there may be a plurality of options for values of $a_{11}$, $a_{12}$, and $a_{13}$. This is not limited in this embodiment of the present application. For example, $Y=0.2126*R+0.7152*G+0.0722*B$ or $Y=0.2627*R+0.6780*G+0.0593*B$. Persons skilled in the art may learn that, the R component, the G component, the B component, and the Y component are all related to luminance of an HDR image. Therefore, determining nonlinear primary color values of all components of each pixel of a first to-be-processed image is that nonlinear primary color values of the R component, the G component, the B component, and the Y component of each pixel of the first to-be-processed image may be obtained.

In a feasible implementation, when the first to-be-processed image is an image in the YUV color space, all the components of each pixel of the image include a Y component, a U component, and a V component. Persons skilled in the art may learn that, the U component and the V component are irrelevant to luminance of the image, and the Y component is related to the luminance of the image. Determining nonlinear primary color values of all components of each pixel of a first to-be-processed image is obtaining a nonlinear primary color value of the Y component of each pixel of the first to-be-processed image.

It should be understood that, because a nonlinear primary color value is a normalized numerical expression value of image information, the foregoing nonlinear primary color value of the image is an image signal value obtained by converting a linear signal value using an optical-electro transfer function.

For ease of description, an example in which the first to-be-processed image is shown in the RGB color space is described below in this embodiment.

Step 102: Determine a maximum value in the nonlinear primary color values of all the components of each pixel of the first to-be-processed image.

In this embodiment, after the nonlinear primary color values of all the components of each pixel of the first to-be-processed image are determined, the maximum value in the nonlinear primary color values of all the components of each pixel of the first to-be-processed image is determined, to be specific, one corresponding maximum value is obtained for each pixel. In addition, it should be understood that, when the first to-be-processed image includes only one suitable component, for example, the Y component when the first to-be-processed image is in the YUV color space, the maximum value in the nonlinear primary color values of all the components is a maximum value in nonlinear primary color values of the suitable component.

For example, assuming that the pixel of the first to-be-processed image includes a pixel k, a nonlinear primary color value of an R component of the pixel k is 0.5, a nonlinear primary color value of a G component of the pixel k is 0.6, and a nonlinear primary color value of a B component of the pixel k is 0.7, it is determined that 0.7 is a maximum value of the three components of the pixel k. A nonlinear primary color value is indicated in a normalized manner, and the largest value of the nonlinear primary color value is 1 and the smallest value of the nonlinear primary color value is 0.

Step 103: Determine dynamic parameters of a first transfer function.

For example, the first transfer function may be an S-shaped transfer curve or a reversed S-shaped transfer curve.

In a feasible implementation, an HDR image needs to be converted into an SDR image using this embodiment of the present application, and the S-shaped transfer curve is selected for the first transfer function.

In a feasible implementation, an SDR image needs to be converted into an HDR image using this embodiment of the present application, and the reversed S-shaped transfer curve is selected for the first transfer function.

In a feasible implementation, conversion between HDR images having different dynamic ranges needs to be implemented using this embodiment of the present application, and the S-shaped transfer curve or the reversed S-shaped transfer curve is selected for the first transfer function.

In this embodiment of the present application, the determining dynamic parameters of a first transfer function includes obtaining the dynamic parameters based on at least one of the following information statistics of the first to-be-processed image, a first reference value of a range of the first to-be-processed image, a second reference value of a range of the first to-be-processed image, a first reference value of a range of a first target image, or a second reference value of a range of a first target image. Particularly, when the first to-be-processed image and the first target image exist in a form of a sequence, the foregoing information further includes statistics of a sequence to which the first to-be-processed image belongs, a first reference value of a range of the sequence to which the first to-be-processed image belongs, a second reference value of the range of the sequence to which the first to-be-processed image belongs, a first reference value of a range of a sequence to which the first target image belongs, and a second reference value of the range of the sequence to which the first target image belongs.

In this embodiment of the present application, the statistics of the first to-be-processed image or the statistics of the sequence to which the first to-be-processed image belongs includes information related to an attribute of the first to-be-processed image or the sequence of the first to-beprocessed image. For example, the statistics includes at least one of the following information of a maximum value, a minimum value, an average value, a standard deviation, and histogram distribution information of a nonlinear primary color value of at least one component of a pixel of the first to-be-processed image or the first to-be-processed image sequence.

Alternatively, the statistics may be a maximum value, a minimum value, an average value, a standard deviation, and histogram distribution information of a linear primary color value of at least one component of a pixel of the first to-be-processed image or the first to-be-processed image sequence.

In a feasible implementation, the statistics includes at least one of a maximum value, a minimum value, an average value, a standard deviation, and histogram distribution information of a nonlinear primary color value of a luminance component (the Y component) of a pixel of the first to-be-processed image or the first to-be-processed image sequence.

It should be understood that, in addition to the cases listed above, the information related to the attribute of the first to-be-processed image or the sequence of the first to-be-processed image may be other information, for example, may be information such as a variance of a nonlinear primary color value of at least one component of the first to-be-processed image or the first to-be-processed image sequence, or a function relationship between the information listed above is used as the statistics. For example, the statistics may be a sum of an average value and a standard deviation of the first to-be-processed image or the sequence of the first to-be-processed image. This is not limited herein.

It should be understood that, the average value of the first to-be-processed image or the sequence of the first to-be-processed image may be an average value of nonlinear primary color values of R components of a set of pixels of the first to-be-processed image or the sequence of the first to-be-processed image, or an average value of nonlinear primary color values of G components of a set of pixels of the first to-be-processed image or the sequence of the first to-be-processed image, or an average value of nonlinear primary color values of B components of a set of pixels of the first to-be-processed image or the sequence of the first to-be-processed image, or an average value of nonlinear primary color values of Y components of a set of pixels of the first to-be-processed image or the sequence of the first to-be-processed image, or an average value of linear primary color values of R components of a set of pixels of the first to-be-processed image or the sequence of the first to-be-processed image, or an average value of linear primary color values of G components of a set of pixels of the first to-be-processed image or the sequence of the first to-be-processed image, or an average value of linear primary color values of B components of a set of pixels of the first to-be-processed image or the sequence of the first to-be-processed image, or an average value of linear primary color values of Y components of a set of pixels of the first to-be-processed image or the sequence of the first to-be-processed image.

It should be understood that, for first to-be-processed images or sequences of first to-be-processed images in different color spaces, there may be a plurality of cases for average values of nonlinear primary color values or linear primary color values corresponding to the first to-be-processed images or the sequences of the first to-be-processed images. In the foregoing example, an example in which the color space is the RGB color space or the YUV color space is used for description, and for another color space, details are not described.

In this embodiment of the present application, the first reference value of the range of the first to-be-processed image or the first reference value of the range of the sequence of the first to-be-processed image may include a maximum luminance value of a display device configured to display the first to-be-processed image, where the display device is preconfigured and is subjectively selected, and is used as a display device configured to display the first to-be-processed image when the dynamic parameters of the first transfer function are determined, a first list lookup value obtained by searching a first preset list based on the statistics of the first to-be-processed image or the statistics of the sequence of the first to-be-processed image, or a first preset value, where for example, the first preset value is set to 0.85 or 0.53.

It should be understood that, in this embodiment of the present application, the first reference value of the range of the first to-be-processed image is obtained based on the statistics of the first to-be-processed image or the statistics of the sequence of the first to-be-processed image and the first preset list. Details are shown as follows.

In a feasible implementation, an HDR image needs to be converted into an SDR image using this embodiment of the present application. The first to-be-processed image is an HDR image. An example in which the statistics of the first to-be-processed image is the sum of the average value and the standard deviation of the first to-be-processed image is used to describe obtaining of the first list lookup value, namely, the first reference value of the range of the first to-be-processed image by searching the first preset list based on the statistics of the first to-be-processed image. List information of the first preset list is shown in Table 1:

TABLE 1

| Sum of the average value and the standard deviation | 0.2 | 0.5 | 0.7 |
|---|---|---|---|
| First reference value of the range of the first to-be-processed image (HDR) | 0.85 | 0.9 | 0.92 |

As shown in Table 1, for example, when the sum of the average value and the standard deviation of the first to-be-processed image is greater than 0.7, the first reference value of the range of the first to-be-processed image is set to 0.92. When the sum of the average value and the standard deviation of the first to-be-processed image is less than 0.2, the first reference value of the range of the first to-be-processed image is set to 0.85. When the sum of the average value and the standard deviation of the first to-be-processed image falls within a range between 0.2 and 0.5, a value of the first reference value of the range of the first to-be-processed image may be obtained through interpolation based on the data 0.2 and 0.5. When the sum falls within a range between 0.5 and 0.7, the first reference value may also be obtained through interpolation. The first reference value may be obtained through interpolation such as linear interpolation or weighted averaging interpolation. This is not limited herein, and details are not described.

In a feasible implementation, an SDR image needs to be converted into an HDR image using this embodiment of the present application. The first to-be-processed image is an SDR image. An example in which the statistics of the first to-be-processed image is the sum of the average value and the standard deviation of the first to-be-processed image is used to describe obtaining of the first list lookup value, namely, the first reference value of the range of the first to-be-processed image by searching the first preset list based on the statistics of the first to-be-processed image. List information of the first preset list is shown in Table 2.

TABLE 2

| | | | |
|---|---|---|---|
| Sum of the average value and the standard deviation | 0.2 | 0.5 | 0.7 |
| First reference value of the range of the first to-be-processed image (SDR) | 0.53 | 0.56 | 0.58 |

As shown in Table 2, for example, when the sum of the average value and the standard deviation of the first to-be-processed image is greater than 0.7, the first reference value of the range of the first to-be-processed image is set to 0.58. When the sum of the average value and the standard deviation of the first to-be-processed image is less than 0.2, the first reference value of the range of the first to-be-processed image is set to 0.53. When the sum of the average value and the standard deviation of the first to-be-processed image falls within a range between 0.2 and 0.5, a value of the first reference value of the range of the first to-be-processed image may be obtained through interpolation based on the data 0.2 and 0.5. When the sum falls within a range between 0.5 and 0.7, the first reference value may also be obtained through interpolation. The first reference value may be obtained through interpolation such as linear interpolation or weighted averaging interpolation. This is not limited herein, and details are not described.

In a feasible implementation, conversion between HDR images having different dynamic ranges needs to be implemented using this embodiment of the present application. The first to-be-processed image is an HDR image. An example in which the statistics of the first to-be-processed image is the sum of the average value and the standard deviation of the first to-be-processed image is used to describe obtaining of the first list lookup value, namely, the first reference value of the range of the first to-be-processed image by searching the first preset list based on the statistics of the first to-be-processed image. List information of the first preset list is shown in Table 3.

TABLE 3

| | | | |
|---|---|---|---|
| Sum of the average value and the standard deviation | 0.2 | 0.5 | 0.7 |
| First reference value of the range of the first to-be-processed image (HDR) | 0.82 | 0.85 | 0.90 |

As shown in Table 3, for example, when the sum of the average value and the standard deviation of the first to-be-processed image is greater than 0.7, the first reference value of the range of the first to-be-processed image is set to 0.90. When the sum of the average value and the standard deviation of the first to-be-processed image is less than 0.2, the first reference value of the range of the first to-be-processed image is set to 0.82. When the sum of the average value and the standard deviation of the first to-be-processed image falls within a range between 0.2 and 0.5, a value of the first reference value of the range of the first to-be-processed image may be obtained through interpolation based on the data 0.2 and 0.5. When the sum falls within a range between 0.5 and 0.7, the first reference value may also be obtained through interpolation. The first reference value may be obtained through interpolation such as linear interpolation or weighted averaging interpolation. This is not limited herein, and details are not described.

It should be understood that, Table 1 to Table 3 are preconfigured lists, and the data in Table 1 to Table 3 is optimal parameters obtained based on subjective empirical data. In addition, it should be understood that, Table 1 to Table 3 are described herein using only the example in which the statistics of the first to-be-processed image is the sum of the average value and the standard deviation of the first to-be-processed image. The first reference value of the range of the first to-be-processed image may alternatively be obtained using other statistics of the first to-be-processed image or the statistics of the sequence of the first to-be-processed image or by searching a table. This is not limited herein, and details are not described.

In this embodiment of the present application, the second reference value of the range of the first to-be-processed image or the second reference value of the range of the sequence of the first to-be-processed image may include a minimum luminance value of a display device configured to display a second to-be-processed image, where the display device is preconfigured and is subjectively selected, and is used as a display device configured to display the first to-be-processed image when the dynamic parameters of the first transfer function are determined, a second list lookup value obtained by searching a second preset list based on the statistics of the first to-be-processed image or the statistics of the sequence of the first to-be-processed image, or a second preset value, where for example, the second preset value is set to 0.05 or 0.12.

Similarly, in this embodiment, the second reference value of the range of the first to-be-processed image is obtained by searching the second preset list using the statistics of the first to-be-processed image or the statistics of the sequence of the first to-be-processed image. Details are shown as follows.

In a feasible implementation, an HDR image needs to be converted into an SDR image using this embodiment of the present application. The first to-be-processed image is an HDR image. An example in which the statistics of the first to-be-processed image is a difference between the average value and the standard deviation of the first to-be-processed image is used to describe obtaining of the second list lookup value, namely, the second reference value of the range of the first to-be-processed image using a preset lookup list based on the statistics of the first to-be-processed image. List information of the second preset list is shown in Table 4.

TABLE 4

| | | | |
|---|---|---|---|
| Difference between the average value and the standard deviation | 0.1 | 0.2 | 0.35 |
| Second reference value of the range of the first to-be-processed image (HDR) | 0 | 0.005 | 0.01 |

As shown in Table 4, for example, when the difference between the average value and the standard deviation of the first to-be-processed image is greater than 0.35, the second reference value of the range of the first to-be-processed image is set to 0.01. When the difference between the average value and the standard deviation of the first to-be-processed image is less than 0.1, the second reference value of the range of the first to-be-processed image is set to 0. When the difference between the average value and the standard deviation of the first to-be-processed image falls within a range between 0.1 and 0.2, a value of the second reference value of the range of the first to-be-processed image may be obtained through interpolation based on 0.1 and 0.2. The second reference value may be obtained through interpolation such as linear interpolation or weighted averaging interpolation. This is not limited herein, and details are not described herein.

In a feasible implementation, an SDR image needs to be converted into an HDR image using this embodiment of the present application. The first to-be-processed image is an SDR image. An example in which the statistics of the first to-be-processed image is a difference between the average value and the standard deviation of the first to-be-processed image is used to describe obtaining of the second list lookup value, namely, the second reference value of the range of the first to-be-processed image using a preset lookup list based on the statistics of the first to-be-processed image. List information of the second preset list is shown in Table 5.

TABLE 5

| | | | |
|---|---|---|---|
| Difference between the average value and the standard deviation | 0.1 | 0.2 | 0.35 |
| Second reference value of the range of the first to-be-processed image (SDR) | 0.1 | 0.12 | 0.15 |

As shown in Table 5, for example, when the difference between the average value and the standard deviation of the first to-be-processed image is greater than 0.35, the second reference value of the range of the first to-be-processed image is set to 0.15. When the difference between the average value and the standard deviation of the first to-be-processed image is less than 0.1, the second reference value of the range of the first to-be-processed image is set to 0.1. When the difference between the average value and the standard deviation of the first to-be-processed image falls within a range between 0.1 and 0.2, a value of the second reference value of the range of the first to-be-processed image may be obtained through interpolation based on 0.1 and 0.2. The second reference value may be obtained through interpolation such as linear interpolation or weighted averaging interpolation. This is not limited herein, and details are not described herein.

In a feasible implementation, conversion between HDR images having different dynamic ranges needs to be implemented using this embodiment of the present application. The first to-be-processed image is an HDR image. An example in which the statistics of the first to-be-processed image is a difference between the average value and the standard deviation of the first to-be-processed image is used to describe obtaining of the second list lookup value, namely, the second reference value of the range of the first to-be-processed image using a preset lookup list based on the statistics of the first to-be-processed image. List information of the second preset list is shown in Table 6.

TABLE 6

| | | | |
|---|---|---|---|
| Difference between the average value and the standard deviation | 0.1 | 0.2 | 0.35 |
| Second reference value of the range of the first to-be-processed image (HDR) | 0.005 | 0.01 | 0.012 |

As shown in Table 6, for example, when the difference between the average value and the standard deviation of the first to-be-processed image is greater than 0.35, the second reference value of the range of the first to-be-processed image is set to 0.012. When the difference between the average value and the standard deviation of the first to-be-processed image is less than 0.1, the second reference value of the range of the first to-be-processed image is set to 0.005. When the difference between the average value and the standard deviation of the first to-be-processed image falls within a range between 0.1 and 0.2, a value of the second reference value of the range of the first to-be-processed image may be obtained through interpolation based on 0.1 and 0.2. The second reference value may be obtained through interpolation such as linear interpolation or weighted averaging interpolation. This is not limited herein, and details are not described herein.

Similarly, it should be understood that, Table 4 to Table 6 are preconfigured lists, and the data in Table 4 to Table 6 is optimal parameters obtained based on subjective empirical data. In addition, it should be understood that, Table 4 to Table 6 are described herein using only the example in which the statistics of the first to-be-processed image is the difference between the average value and the standard deviation of the first to-be-processed image. The second reference value of the range of the first to-be-processed image may be obtained using other statistics of the first to-be-processed image or by searching a table. This is not limited herein, and details are not described.

In this embodiment of the present application, the first reference value of the range of the first target image or the first reference value of the range of the sequence of the first target image may include a maximum luminance value of a display device configured to display the first target image, where the display device is preconfigured and is subjectively selected, and is used as a display device configured to display the first target image when the dynamic parameters of the first transfer function are determined, or a third preset value, where for example, the third preset value is set to 0.53 or 0.85.

In this embodiment of the present application, the second reference value of the range of the first target image or the second reference value of the range of the sequence of the first target image may include a minimum luminance value of a display device configured to display the first target image, where the display device is preconfigured and is subjectively selected, and is used as a display device configured to display the first target image when the dynamic parameters of the first transfer function are determined, or a fourth preset value, where for example, the fourth preset value is set to 0.12 or 0.05.

For ease of description and understanding, in step 104, an actual first transfer function is used as an example to describe a manner of obtaining the dynamic parameters of the first transfer function. For details, refer to step 104.

It should be understood that, no time sequence relationship is limited between step 102 and step 103. Alternatively, step 103 may be performed first, and then step 102 is performed.

Step 104: Convert the maximum value of each pixel into a transfer value based on the first transfer function for which the dynamic parameters are already determined.

To be specific, in this embodiment of the present application, when the maximum value in the nonlinear primary color values of all the components of each pixel of the first to-be-processed image is determined, the maximum value of each pixel of the first to-be-processed image may be converted based on the first transfer function to obtain the transfer value corresponding to each pixel of the first to-be-processed image, to be specific, each pixel of the first to-be-processed image corresponds to one maximum value and one transfer value.

For ease of understanding and description, the first transfer function used in this application is first described below.

In a feasible implementation, the first transfer function is an S-shaped transfer curve.

Figure 3:
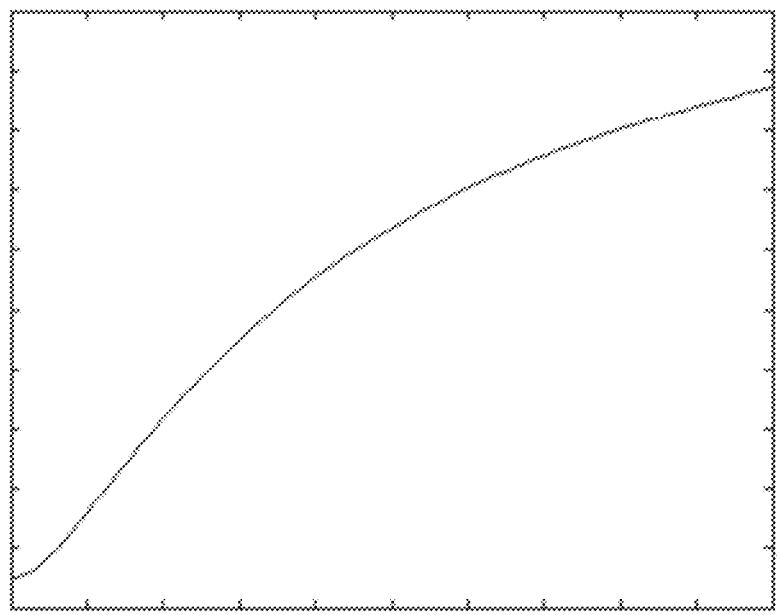
FIG. 3 is a schematic diagram of an S-shaped transfer curve according to an embodiment of the present application.

In this embodiment of the present application, the S-shaped transfer curve in this embodiment of the present application is a curve whose slope increases initially and then decreases. As shown in FIG. 3, FIG. 3 is a schematic diagram of an S-shaped transfer curve whose slope increases initially and then decreases according to an embodiment of the present application.

Figure 4:
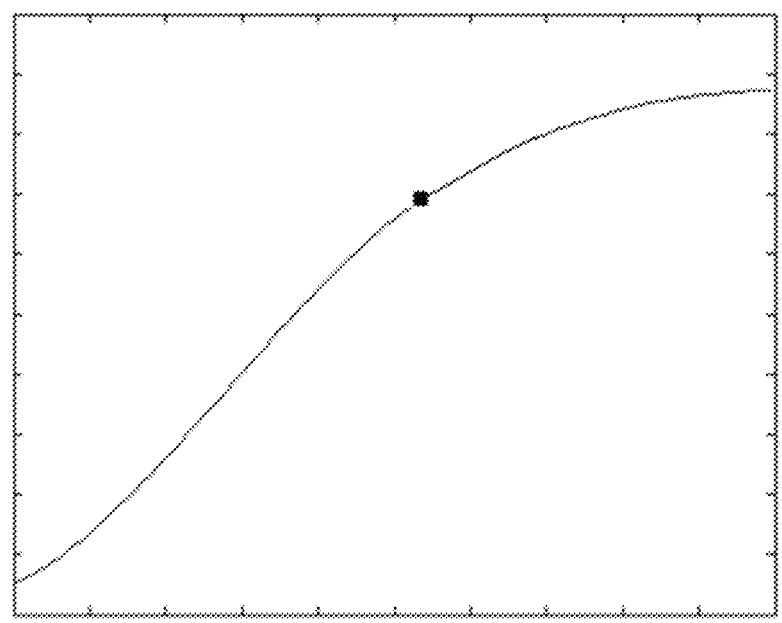
FIG. 4 is a schematic diagram of an S-shaped transfer curve consisting of two sections of curves according to an embodiment of the present application.

With reference to FIG. 3, the S-shaped transfer curve in this embodiment of the present application may alternatively be a curve that includes one or more sections of curves and whose slope increases initially and then decreases. As shown in FIG. 4, FIG. 4 is a schematic diagram of an S-shaped transfer curve consisting of two sections of curves according to an embodiment of the present application. In FIG. 4, a black point indicates a connection point between the two sections of curves.

For ease of understanding, two S-shaped transfer curves used in this embodiment of the present application are described below using specific forms.

Manner 1: The S-shaped transfer curve may use a curve in the following form:

$$L' = a * \left(\frac{p*L}{(p-1)*L}\right)^m + b,$$

where L is the maximum value in the nonlinear primary color values of all the components of each pixel of the first to-be-processed image, namely, each pixel of the first to-be-processed image, L' is the transfer value corresponding to each pixel, the parameters a, b, p, and m are dynamic parameters of the S-shaped transfer curve, the parameters p and m are used to control a shape of the curve and a curvature of the curve, and the parameters a and b are used to control a range of the curve, to be specific, positions of a start point and an end point of the curve.

In this embodiment, the parameters p and m may be obtained in a plurality of manners. Details are separately described below.

1. The parameters p and m are obtained by searching a third preset list based on statistics of the first to-be-processed image or statistics of a sequence of the first to-be-processed image.

For ease of description, an example in which the statistics of the first to-be-processed image or the statistics of the sequence of the first to-be-processed image is an average value of nonlinear primary color values of Y components of the sequence of the first to-be-processed image is used for description. Herein, assuming that the average value of the nonlinear primary color values of the Y components of the sequence of the first to-be-processed image is y, information about the third preset list is shown in the following Table 7.

TABLE 7

| y | 0.1 | 0.25 | 0.3 | 0.55 | 0.6 |
|---|-----|------|-----|------|-----|
| p | 6.0 | 5.0  | 4.5 | 4.0  | 3.2 |
| m | 2.2 | 2.25 | 2.3 | 2.35 | 2.4 |

As shown in Table 7, when the average luminance value y of the nonlinear primary color values of the Y components of the sequence of the first to-be-processed image is greater than 0.6, the parameter p is set to 3.2, and the parameter m is set to 2.4. When y is less than 0.1, the parameter p is set to 6.0, and the parameter m is set to 2.2. When y falls within a range between 0.55 and 0.6, the parameters p and m may be obtained through interpolation.

An interpolation method may use any manner, for example, a manner such as linear interpolation or weighted averaging interpolation. This is not limited herein. For example, herein, p is used as an example for description. When y falls within the range between 0.55 and 0.6, the parameter p may be obtained in the following linear interpolation manner.

$$p=4.0+(y-0.55)/(0.6-0.55)*(3.2-4.0).$$

For another case, for example, when y falls within a range between 0.1 and 0.25, the corresponding parameters p and m may be obtained by analogy. Details are not described herein.

It should be understood that, Table 7 is a preconfigured list, and the data in Table 7 is optimal parameters obtained based on subjective empirical data. In addition, it should be understood that, Table 7 is described herein using only the example in which the statistics of the sequence of the first to-be-processed image is the average value y of the nonlinear primary color values of the Y components of the sequence of the first to-be-processed image is used. The parameters p and m may be obtained using other statistics of the first to-be-processed image or other statistics of the sequence of the first to-be-processed image or by searching a table. This is not limited herein, and details are not described.

2. The parameters p and m are determined based on both a performance parameter, such as a Gamma value, of a display device for a first target image, and statistics of the first to-be-processed image or statistics of a sequence of the first to-be-processed image.

For example, the Gamma value of the display device for the first target image may be determined first, and the Gamma value of the reference display device for the first target image is used as the parameter m. For example, Gamma values of common SDR display devices are all 2.4, to be specific, the parameter m may be set to 2.4. The parameter p is obtained by searching the foregoing Table 3.

It should be understood that, in addition to the foregoing two manners, the parameters p and m may be obtained in another manner. This is not limited herein. An example is as follows.

3. The parameters p and m may be embedded into pre-production, and are manually adjusted by color correction personnel to obtain corresponding parameters p and m used when color information, such as a color, saturation, and a contrast, of a first target image basically keeps consistent with that of the obtained first to-be-processed image, and the parameters p and m adjusted by the color correction personnel are received.

Several manners of obtaining the parameters p and m are described above, and how to obtain the parameters a and b is described below.

After the parameters p and m are determined in the manners described above, the parameters a and b may be obtained through calculation using the following system of equations:

$$L'_1 = a * \left(\frac{p*L_1}{(p-1)*L_1+1}\right)^m + b; \text{ and}$$

$$L'_2 = a * \left(\frac{p*L_2}{(p-1)*L_2+1}\right)^m + b,$$

where $L_1$ is a first reference value of a range of the first to-be-processed image or a first reference value of a range of a sequence of the first to-be-processed image, $L_2$ is a second reference value of the range of the first to-be-processed image or a second reference value of the range of the sequence of the first to-be-processed image, $L'_1$ is a first reference value of a range of a first target image or a first reference value of a range of a sequence of a first target image, and $L'_2$ is a second reference value of the range of the first target image or a second reference value of the range of the sequence of the first target image.

Manner 2: An S-shaped transfer curve in the following form is used and consists of two functions, when $L_0 \leq L \leq L_1$, a value of L' is calculated using the following formula:

$$L' = (2t^3-3t^2+1)L'_0 + (t^3-2t^2+t)(L_1-L_0)k_0 + (-2t^3+3t^2)L'_1 + (t^3-t^2)(L_1-L_0)k_1,$$

where $$t = \frac{L-L_0}{L_1-L_0},$$

and when $L_1 < L \leq L_2$, a value of L' is calculated using the following formula:

$$L' = (2t^3-3t^2+1)L'_1 + (t^3-2t^2+t)(L_2-L_1)k_1 + (-2t^3+3t^2)L'_2 + (t^3-t^2)(L_2-L_1)k_2,$$

where $$t = \frac{L-L_1}{L_2-L_1},$$

L is the maximum value in the nonlinear primary color values of all the components of each pixel of the first to-be-processed image, and L' is the transfer value corresponding to each pixel, and $L_0$, $L_1$, $L_2$, $L'_0$, $L'_1$, $L'_2$, $k_0$, $k_1$, and $k_2$ are dynamic parameters of the S-shaped transfer curve, $L_0$, $L'_0$, and $k_0$ respectively indicate an input value, an output value, and a slope of a start point of a first section of curve, $L_1$, $L'_1$, and $k_1$ respectively indicate an input value, an output value, and a slope of a connection point between the first section of curve and a second section of curve, $L_2$, $L'_2$, and $k_2$ respectively indicate an input value, an output value, and a slope of an end point of the second section of curve, and $k_0$ $k_1$, and $k_2$ satisfy that $k_0 < k_1$ and $k_1 > k_2$. To be specific, it is ensured that the S-shaped transfer curve in Manner 2 is a curve whose slope increases initially and then decreases.

The, $L_0$ is a first reference value of a range of the first to-be-processed image or a first reference value of a range of a sequence of the first to-be-processed image, $L_2$ is a second reference value of the range of the first to-be-processed image or a second reference value of the range of the sequence of the first to-be-processed image, $L'_0$ is a first reference value of a range of a first target image or a first reference value of a range of a sequence of a first target image, and $L'_2$ is a second reference value of the range of the first target image or a second reference value of the range of the sequence of the first target image, and the parameters $L_1$, $L'_1$, $k_0$, $k_1$, and $k_2$ are obtained by searching a fourth or fifth preset list based on statistics of the first to-be-processed image or statistics of the sequence of the first to-be-processed image.

The fourth preset list includes Table 4, and the fifth preset list includes Table 5. $L_1$, $k_0$, $k_0$, and $k_2$ may be obtained by searching the following Table 8. Herein, an example in which the statistics of the first to-be-processed image or the statistics of the sequence of the first to-be-processed image is an average value of nonlinear primary color values of Y components of the sequence of the first to-be-processed image is used for description. Herein, assuming that the average value of the nonlinear primary color values of the Y components of the sequence of the first to-be-processed image is y, list information corresponding to y is shown in the following Table 8.

TABLE 8

| y | 0.1 | 0.25 | 0.3 | 0.55 | 0.6 |
|---|---|---|---|---|---|
| $L_1$ | 0.13 | 0.28 | 0.34 | 0.58 | 0.63 |
| $k_0$ | 0 | 0.05 | 0.1 | 0.15 | 0.2 |
| $k_1$ | 0.8 | 1.0 | 1.2 | 1.4 | 1.5 |
| $k_2$ | 0 | 0.05 | 0.1 | 0.15 | 0.2 |

As shown in Table 8, for example, when y is 0.1, correspondingly, $L_1$ is set to 0.13, $k_0$ is set to 0, $k_1$ is set to 0.8, and $k_2$, is set to 0. When y is another value, based on Table 8, the corresponding parameters $L_1$, $k_0$, $k_1$, and $k_2$ may be obtained by analogy. Details are not described herein.

Herein, it should be understood that, when y falls within a range of the values corresponding to y in Table 8, for example, when y falls within a range between 0.5 and 0.55, the corresponding parameters $L_1$, $k_0$, $k_1$, and $k_2$ may be obtained through interpolation. Details are not described herein.

$L'_1$ may be obtained by searching Table 9. Herein, an example in which the statistics of the first to-be-processed image or the statistics of the sequence of the first to-be-processed image is a sum of an average value and a standard deviation of nonlinear primary color values of Y components of the first to-be-processed image is used for description. Herein, assuming that the sum of the average value and the standard deviation of the first to-be-processed image is x, details are shown in the following Table 9.

TABLE 9

| x | 0.2 | 0.5 | 0.7 |
|---|---|---|---|
| $L'_1$ | 0.3 | 0.4 | 0.5 |

As shown in Table 9, for example, when x is 0.2, $L'_1$ is set to 0.3. When x is 0.5, $L'_1$ is set to 0.7. When x falls within a range between 0.2 and 0.5, corresponding $L'_1$ may be obtained through interpolation. Details about how to obtain the corresponding $L'_1$ through interpolation are not described herein.

It should be understood that, in this embodiment, in addition to obtaining $L'_1$ by searching a table, $L'_1$ may be obtained using a preset calculation formula. For example, $L'_1$ may be obtained using the following formula:

$$L'_1 = \sqrt{L_1 \times \sqrt{L'_0 \times L'_2}}.$$

In this embodiment, after the dynamic parameters of the S-shaped transfer curve are obtained, the maximum value in the nonlinear primary color values of all the components of each pixel of the first to-be-processed image may be processed using the S-shaped transfer curve. An example in which the S-shaped transfer curve is the S-shaped transfer curve in the foregoing Manner 1 or Manner 2 is used. The maximum value in the nonlinear primary color values of all the components of each pixel of the first to-be-processed image may be substituted into the formula shown in Manner 1 or Manner 2, to obtain the transfer value.

In a feasible implementation, the first transfer function is a reversed S-shaped transfer curve.

Figure 5:
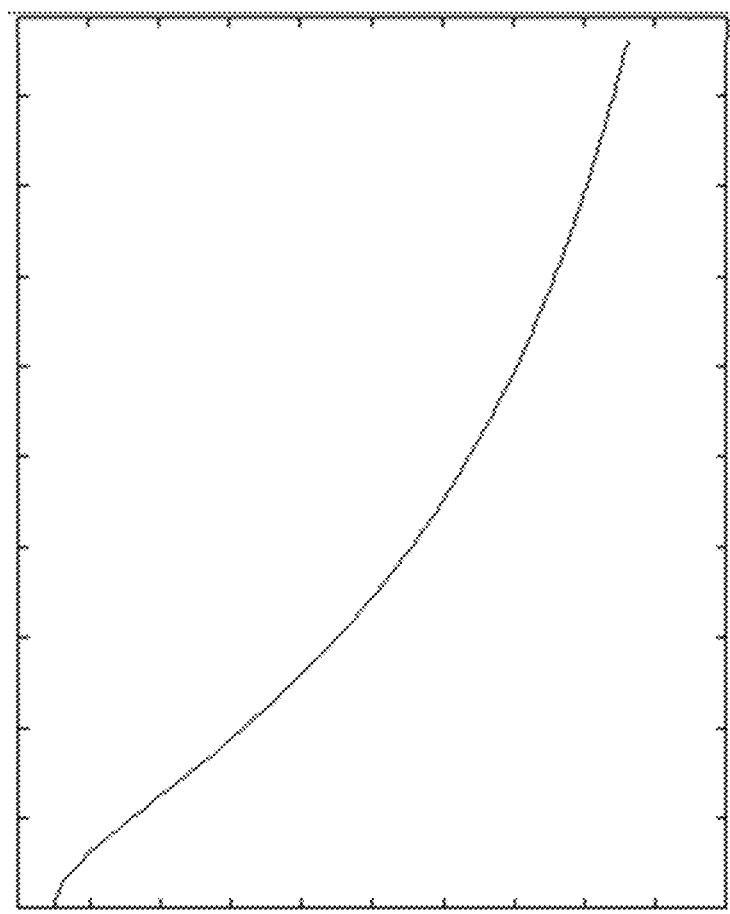
FIG. 5 is a schematic diagram of a reversed S-shaped transfer curve according to an embodiment of the present application.

In this embodiment of the present application, the reversed S-shaped transfer curve in this embodiment of the present application is a curve whose slope decreases initially and then increases. As shown in FIG. 5, FIG. 5 is a schematic diagram of a reversed S-shaped transfer curve whose slope decreases and then increases according to an embodiment of the present application.

Figure 6:
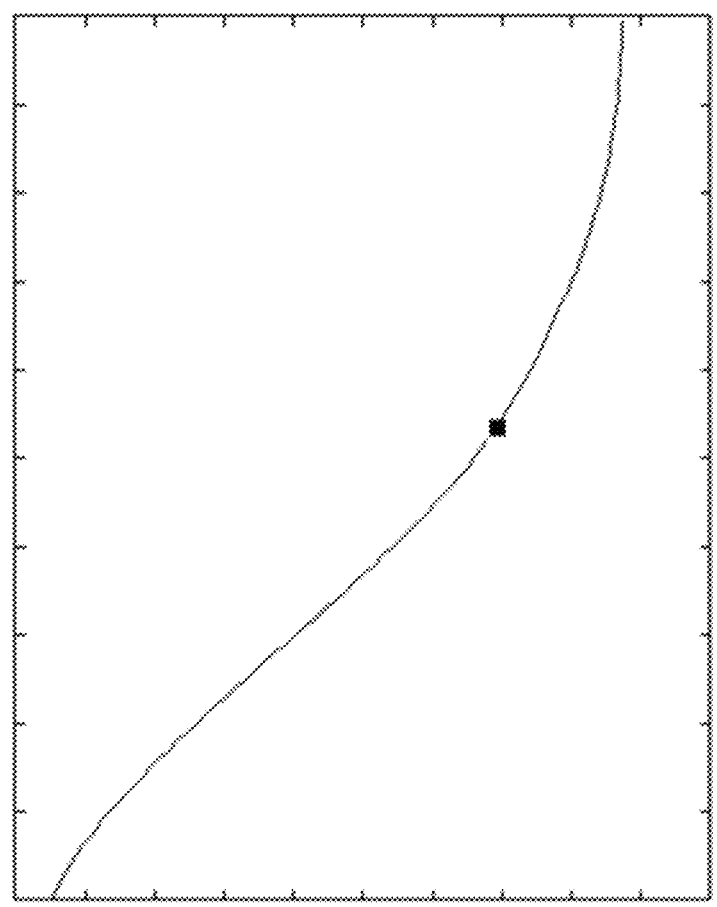
FIG. 6 is a schematic diagram of a reversed S-shaped transfer curve consisting of two sections of curves according to an embodiment of the present application.

With reference to FIG. 5, the reversed S-shaped transfer curve in this embodiment of the present application may be a curve that includes one or more sections of curves and whose slope decreases initially and then increases. As shown in FIG. 6, FIG. 6 is a schematic diagram of a reversed S-shaped transfer curve consisting of two sections of curves according to an embodiment of the present application. A black point indicates a connection point between the two sections of curves.

For ease of understanding, the reversed S-shaped transfer curve used in this embodiment of the present application is described below using specific forms.

First manner: The reversed S-shaped transfer curve may use a curve in the following form:

$$L' = \frac{1}{p \times \left(\frac{L-b}{a}\right)^{-\frac{1}{m}} - p + 1},$$

where L is a maximum value in nonlinear primary color values of all components of each pixel of target image information, L' is a maximum value obtained through conversion, the parameters a, b, p, and m are dynamic parameters of the reversed S-shaped transfer curve, the parameters p and m are used to control a shape of the curve and a curvature of the curve, and the parameters a and b are used to control a range of the curve, to be specific, positions of a start point and an end point of the curve.

In this embodiment, the parameters p and m may be obtained in a plurality of manners. Details are separately described below.

1. The parameters p and m are obtained by searching a sixth preset list based on statistics of the first to-be-processed image or statistics of a sequence of the first to-be-processed image.

For ease of description, herein, assuming that an average value of nonlinear primary color values of Y components of the first to-be-processed image or the sequence of the first to-be-processed image is y, information about the seventh preset list is shown in the following Table 10:

TABLE 10

| y | 0.1 | 0.25 | 0.3 | 0.55 | 0.6 |
|---|-----|------|-----|------|-----|
| p | 6.0 | 5.0  | 4.5 | 4.0  | 3.2 |
| m | 2.2 | 2.25 | 2.3 | 2.35 | 2.4 |

As shown in Table 10, when the average luminance value of the nonlinear primary color values of the Y components of the first to-be-processed image or the sequence of the first to-be-processed image is greater than 0.6, the parameter p is set to 3.2, and the parameter m is set to 2.4. When y is less than 0.1, the parameter p is set to 6.0, and the parameter m is set to 2.2. When y falls within a range between 0.55 and 0.6, the parameters p and m may be obtained through interpolation. This is not limited herein, and details are not described.

2. The parameters p and m are obtained based on both a performance parameter, such as a Gamma value, of a display device for a first target image and statistics of the first to-be-processed image or statistics of a sequence of the first to-be-processed image.

For example, the Gamma value of the display device for the first target image may be selected as the parameter m. The parameter p is obtained by searching the foregoing Table 3.

It should be understood that, in addition to the foregoing two manners, the parameters p and m may be obtained in another manner. This is not limited herein. An example is as follows.

3. The parameters p and m may be embedded into pre-production, and are manually adjusted by color correction personnel to obtain corresponding parameters p and m used when color information, such as a color, saturation, and a contrast, of the obtained first to-be-processed image basically keeps consistent with that of a first target image, and the adjusted parameters p and m are received.

Manners of obtaining the parameters p and m are described above, and how to obtain the parameters a and b is described below.

After the parameters p and m are determined in the manners described above, the parameters a and b are obtained through calculation by solving the following system of equations:

$$L'_1 = \frac{1}{p \times \left(\frac{L_1-b}{a}\right)^{-\frac{1}{m}} - p + 1}; \text{ and}$$

$$L'_2 = \frac{1}{p \times \left(\frac{L_2-b}{a}\right)^{-\frac{1}{m}} - p + 1},$$

where $L_1$ is a first reference value of a range of the first to-be-processed image or a first reference value of a range of a sequence of the first to-be-processed image, $L_2$ is a second reference value of the range of the first to-be-processed image or a second reference value of the range of the sequence of the first to-be-processed image, $L'_1$ is a first reference value of a range of an output first target image, and $L'_2$ is a second reference value of the range of the output first target image.

Manner 2: A reversed S-shaped transfer curve in the following form is used and consists of two functions, when $L_0 \leq L \leq L_1$ a value of L' is calculated using the following formula:

$$L'=(2t^3-3t^2+1)L'_0+(t^3-2t^2+t)(L_1-L_0)k_0+(-2t^3+3t^2)L'_1+(t^3-t^2)(L_1-L_0)k_1,$$

where $$t = \frac{L-L_0}{L_1-L_0},$$

and when $L_1 < L \leq L_2$, a value of L' is calculated using the following formula:

$$L'=(2t^3-3t^2+1)L'_1+(t^3-2t^2+t)(L_2-L_1)k_1+(-2t^3+3t^2)L'_2+(t^3-t^2)(L_2-L_1)k_2,$$

where $$t = \frac{L - L_1}{L_2 - L_1},$$

L is a maximum value in nonlinear primary color values of all components of each pixel of target image information, and L' is the transfer value, and $L_0$, $L_1$, $L_2$, $L'_0$, $L'_1$, $L'_2$, $k_0$, $k_1$, and $k_2$ are dynamic parameters of the reversed S-shaped transfer curve, $L_0$, $L'_0$, and $k_0$ respectively indicate an input value, an output value, and a slope of a start point of a first section of curve, $L_1$, $L'_1$, and $k_1$ respectively indicate an input value, an output value, and a slope of a connection point between the first section of curve and a second section of curve, $L_2$, $L'_2$, and $k_2$ respectively indicate an input value, an output value, and a slope of an end point of the second section of curve, and $k_0$, $k_1$, and $k_2$ satisfy that $k_0 > k_1$ and $k_1 < k_2$. To be specific, it is ensured that the reversed S-shaped transfer curve in Manner 2 is a curve whose slope decreases initially and then increases.

In this embodiment, $L_0$ is a first reference value of a range of the first to-be-processed image or a first reference value of a range of a sequence of the first to-be-processed image, $L_2$ is a second reference value of the range of the first to-be-processed image or a second reference value of the range of the sequence of the first to-be-processed image, $L'_0$ is a first reference value of a range of a first target image or a first reference value of a range of a sequence of a first target image, and $L'_2$ is a second reference value of the range of the first target image or a second reference value of the range of the sequence of the first target image, and the parameters $L_1$, $L'_1$, $k_0$, $k_1$, and $k_2$ are obtained by searching a seventh or eighth preset list based on statistics of the first to-be-processed image or statistics of the sequence of the first to-be-processed image.

The seventh preset list includes Table 11, and the eighth preset list includes Table 12. $L_1$, $k_0$, $k_1$, and $k_2$ may be obtained by searching the following Table 11. Herein, an example in which the statistics of the first to-be-processed image or the statistics of the sequence of the first to-be-processed image is an average value of nonlinear primary color values of Y components of the first to-be-processed image or the sequence of the first to-be-processed image is used for description. Herein, assuming that the average value of the nonlinear primary color values of the Y components of the first to-be-processed image or the sequence of the first to-be-processed image is y, details are shown in the following Table 11.

TABLE 11

| y | 0.1 | 0.25 | 0.3 | 0.55 | 0.6 |
|---|-----|------|-----|------|-----|
| $L_1$ | 0.13 | 0.28 | 0.34 | 0.58 | 0.63 |
| $k_0$ | 0.8 | 1.0 | 1.2 | 1.4 | 1.5 |
| $k_1$ | 0 | 0.05 | 0.1 | 0.15 | 0.2 |
| $k_2$ | 0.8 | 1.0 | 1.2 | 1.4 | 1.5 |

As shown in Table 11, for example, when y is 0.1, correspondingly, $L_1$ is set to 0.13, $k_0$ is set to 0.8, $k_1$ is set to 0, and $k_2$ is set to 0.8. When y is another value, based on Table 11, the corresponding parameters $L_1$, $k_0$, $k_1$, and $k_2$ may be obtained by analogy. Details are not described herein.

$L'_1$ may be obtained by searching Table 12. Herein, an example in which the statistics of the first to-be-processed image or the statistics of the sequence of the first to-be-processed image is a sum of an average value and a standard deviation of the first to-be-processed image or the sequence of the first to-be-processed image is used for description. Herein, assuming that the sum of the average value and the standard deviation of the first to-be-processed image or the sequence of the first to-be-processed image is x, details are shown in the following Table 12

TABLE 12

| x | 0.2 | 0.5 | 0.7 |
|---|-----|-----|-----|
| $L'_1$ | 0.3 | 0.4 | 0.5 |

As shown in Table 12, for example, when x is 0.2, $L'_1$ is set to 0.3. When x is 0.5, $L'_1$ is set to 0.4. When x falls within a range between 0.2 and 0.5, corresponding $L'_1$ may be obtained through interpolation. Details about how to obtain the corresponding $L'_1$ through interpolation are not described herein.

It should be understood that, in this embodiment, in addition to obtaining $L'_1$ by searching a table, $L'_1$ may be obtained using a preset calculation formula. For example, $L'_1$ may be obtained using the following formula:

$$L'_1 = \sqrt{L_1 \times \sqrt{L'_0 \times L'_2}}.$$

In this embodiment, after the dynamic parameters of the reversed S-shaped transfer curve are obtained, the maximum value in the nonlinear primary color values of all the components of each pixel of the first to-be-processed image may be processed using the reversed S-shaped transfer curve. An example in which the reversed S-shaped transfer curve is the reversed S-shaped transfer curve in the foregoing Manner 1 or Manner 2 is used. The maximum value in the nonlinear primary color values of all the components of each pixel of the first to-be-processed image may be substituted into the formula shown in Manner 1 or Manner 2, to obtain the transfer value.

Step 105: Calculate a ratio between the transfer value and the corresponding maximum value of each pixel.

In this embodiment of the present application, after the maximum value and the corresponding transfer value of each pixel of the first to-be-processed image are determined, the ratio between the transfer value and the corresponding maximum value of each pixel of the first to-be-processed image may be calculated.

Step 106: Adjust a dynamic range for the nonlinear primary color values of all the components of each pixel based on the ratio to obtain nonlinear primary color values of all components of each corresponding pixel of a first target image.

When an image dynamic range of the first to-be-processed image is greater than an image dynamic range of the first target image, an adjustment of narrowing down the dynamic range is performed for the nonlinear primary color values of all the components of each pixel based on the ratio, otherwise, when an image dynamic range of the first to-be-processed image is less than an image dynamic range of the first target image, an adjustment of expanding the dynamic range is performed for the nonlinear primary color values of all the components of each pixel based on the ratio.

In a feasible implementation, a product of the ratio and each of the nonlinear primary color values of all the components of each pixel is calculated, to obtain nonlinear primary color values of all the components of each pixel after the adjustment.

Figure 7:
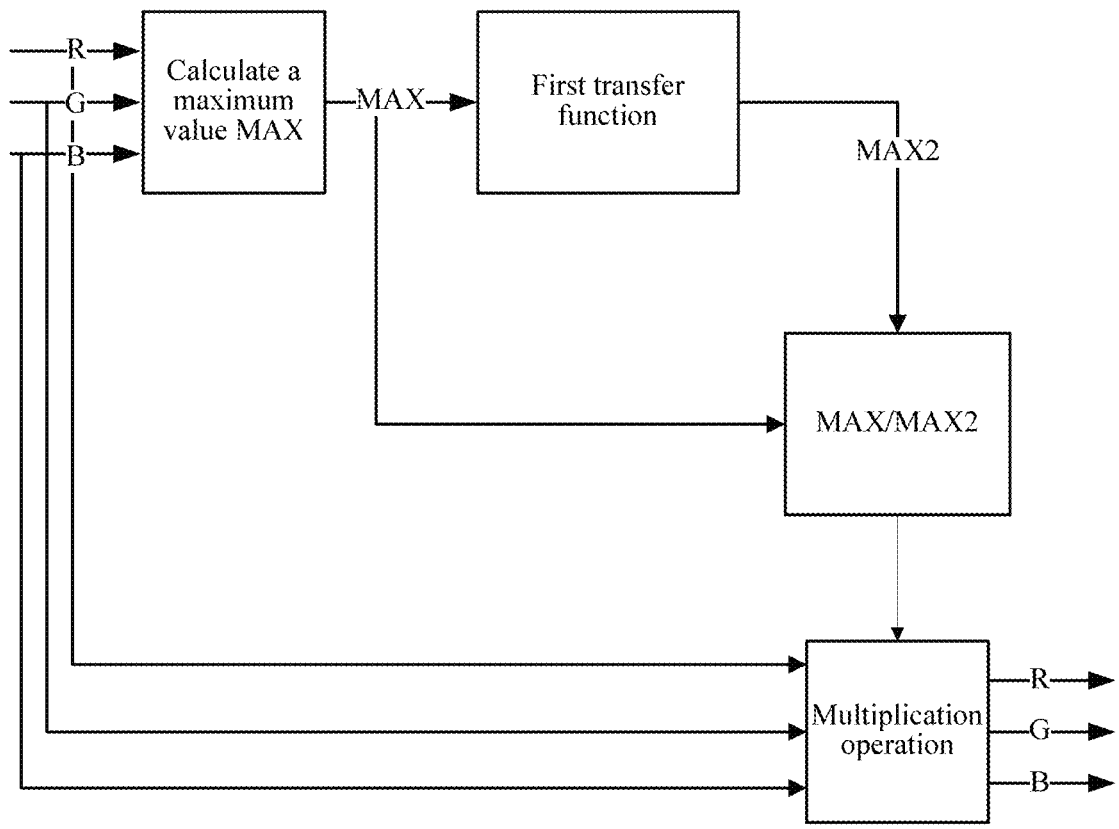
FIG. 7 is a schematic diagram of a dynamic adjustment process of converting a first to-be-processed image into a first target image according to an embodiment of the present application.

For ease of understanding, descriptions are provided below with reference to FIG. 7. FIG. 7 is a schematic diagram of a dynamic adjustment process of converting the first to-be-processed image into the first target image according to an embodiment of the present application.

As shown in FIG. 7, after the first to-be-processed image is obtained, the maximum value MAX in the nonlinear primary color values of all the components of each pixel of the first to-be-processed image, namely, the maximum value in the nonlinear primary color values of the R component, the G component, and the B component corresponding to each pixel, may be obtained.

The MAX value of each pixel is processed using the first transfer function to obtain a MAX2 value of each pixel. A ratio between the MAX2 value and the corresponding MAX value of each pixel is obtained through calculation. Finally, the ratio is multiplied by the nonlinear primary color values of the R component, the G component, and the B component of the corresponding pixel of the first to-be-processed image to finally obtain nonlinear primary color values of all the components of each pixel of the first to-be-processed image after the dynamic range is adjusted.

It should be understood that, only an example in which the first to-be-processed image is an image in an RGB format is used for description above. When the first to-be-processed image is an image in another color space, for example, an image corresponding to the YUV color space, nonlinear primary color values of all suitable components include only the nonlinear primary color value of the Y component, and the obtained maximum value in the nonlinear primary color values is the nonlinear primary color value of the Y component.

It should be understood that, in addition to multiplying the ratio by the nonlinear primary color values of the R component, the G component, and the B component of each pixel of the first to-be-processed image, to perform dynamic compression processing based on the ratio, another dynamic compression processing method may be performed based on the ratio, provided that adjustment processing of narrowing down or expanding the dynamic range can be performed for all the components of each pixel of the first to-be-processed image, and finally, better compatible display on the display device for the first target image can be implemented. This is not further limited herein.

In this embodiment of the present application, in an image conversion process, a fixed static parameter is no longer used, but instead, image conversion is implemented using a preset transfer curve based on the dynamic parameters, and images having different dynamic ranges are better compatible with display devices having different display capabilities.

In another Embodiment 11 of the present application, after step 106 in Embodiment 10, the method further includes the following step.

Step 207: Convert the nonlinear primary color values of all the components of each pixel of the first target image into linear primary color values of all components of a corresponding pixel of a second target image based on a second transfer function.

In a feasible implementation, an HDR image needs to be converted into an SDR image using this embodiment of the present application. Electrical-to-optical conversion may be performed on target image information based on an HDR electro-optical transfer function, to obtain linear primary color values of all components of each pixel of the SDR image. The target image information includes the nonlinear primary color values of all the components of each pixel of the first to-be-processed image that are obtained after the adjustment of narrowing down the dynamic range.

In a feasible implementation, conversion between HDR images needs to be implemented using this embodiment of the present application. It may be assumed that the first target image is an HDR image obtained through conversion using a first transfer curve defined in a first standard. In this embodiment of the present application, the first target image is also referred to as an image that complies with the first standard. Therefore, in this step, the second transfer function is the first transfer curve defined in the first standard. To be specific, the nonlinear primary color values of all the components of each pixel of the first target image are converted into the linear primary color values of all the components of the corresponding pixel of the second target image based on the first transfer curve. For example, it may be assumed that the first target image is data in a PQ domain such that nonlinear primary color values of the pixel of the first target image in the PQ domain are converted into linear primary color values of the pixel of the second target image using a PQ transfer curve. It should be understood that, a transfer curve defined in a high dynamic range image standard includes, but is not limited to, the PQ transfer curve, an SLF transfer curve, or an HLG transfer curve. This is not limited.

In another Embodiment 12 of the present application, after step 207 in Embodiment 11, the method further includes the following step.

Step 308: Convert the linear primary color values of all the components of the corresponding pixel of the second target image into nonlinear primary color values of all the components of the corresponding pixel of the second target image based on a third transfer function.

In a feasible implementation, an HDR image needs to be converted into an SDR image using this embodiment of the present application. Optical-to-electrical conversion is performed on linear primary color values of all components of each pixel of the SDR image according to an SDR optical-electro transfer function to obtain nonlinear primary color values of all the components of each pixel of the output SDR image. Finally, the nonlinear primary color values may be output to an SDR display device for display.

In a feasible implementation, conversion between HDR images needs to be implemented using this embodiment of the present application. It may be assumed that the second target image is an HDR image obtained through conversion using a second transfer curve defined in a second standard. In this embodiment of the present application, the second target image is also referred to as an image that complies with the second standard. Therefore, in this step, the third transfer function is the second transfer curve defined in the second standard. To be specific, the linear primary color values of all the components of each pixel of the second target image are converted into the nonlinear primary color values of all the components of the corresponding pixel of the second target image based on the second transfer curve. For example, it may be assumed that the second target image is data in an HLG domain such that linear primary color values of the pixel of the second target image are converted into nonlinear primary color values of the pixel of the second target image in the HLG domain using an HLG transfer curve. It should be understood that, a transfer curve defined in a high dynamic range image standard includes, but is not limited to, a PQ transfer curve, an SLF transfer curve, or the HLG transfer curve. This is not limited.

In another Embodiment 13 of the present application, after step 207 in Embodiment 11, the method further includes the following step.

Step 409: Determine whether a color space of a display device outputting the second target image is the same as a color space corresponding to the nonlinear primary color values of the second target image.

If the color space of the display device outputting the second target image is not the same as the color space corresponding to the nonlinear primary color values of the second target image, the color space corresponding to the nonlinear primary color values of the second target image is converted into the color space of the display device outputting the second target image.

For example, if the color space corresponding to the nonlinear primary color values of the second target image is a BT.2020 color space, and the display device outputting the second target image is in a BT.709 color space, the BT.2020 color space is converted into the BT.709 color space, and then step 308 in Embodiment 12 is performed.

In this embodiment of the present application, consistency between a display effect of the target image and a display effect of the first to-be-processed image can be effectively ensured after the dynamic range is adjusted, and a probability of occurrence of problems such as a contrast change and a detail loss is reduced, thereby reducing impact on the display effect of the image.

In another Embodiment 14 of the present application, before step 101 in Embodiment 10, the method further includes the following step.

Step 510: Convert linear primary color values of all components of each pixel of a second to-be-processed image into nonlinear primary color values of all components of a corresponding pixel of the first to-be-processed image based on a fourth transfer function.

In a feasible implementation, an SDR image needs to be converted into an HDR image using this embodiment of the present application. After values of all components of each pixel of the SDR image are obtained, optical-to-electrical conversion is performed on the values of all the components of each pixel of the SDR image based on an HDR optical-electro transfer function, to obtain target image information. The target image information is corresponding nonlinear primary color values obtained after the values of the SDR image are converted using the HDR optical-electro transfer function.

In a feasible implementation, conversion between HDR images needs to be implemented using this embodiment of the present application. It may be assumed that the first to-be-processed image is an HDR image obtained through conversion using a first transfer curve defined in a first standard. In this embodiment of the present application, the first to-be-processed image is also referred to as an image that complies with the first standard. Therefore, in this step, the fourth transfer function is the first transfer curve defined in the first standard. To be specific, the linear primary color values of all the components of each pixel of the second to-be-processed image are converted into the nonlinear primary color values of all the components of the corresponding pixel of the first to-be-processed image based on the first transfer curve. For example, it may be assumed that the first to-be-processed image is data in a PQ domain such that linear primary color values of the pixel of the second to-be-processed image are converted into nonlinear primary color values of the pixel of the first to-be-processed image in the PQ domain using a PQ transfer curve. It should be understood that, a transfer curve defined in a high dynamic range image standard includes, but is not limited to, the PQ transfer curve, an SLF transfer curve, or an HLG transfer curve. This is not limited.

In another Embodiment 15 of the present application, before step 510 in Embodiment 14, the method further includes the following step.

Step 611: Convert nonlinear primary color values of all the components of each pixel of the second to-be-processed image into linear primary color values of all the components of the corresponding pixel of the second to-be-processed image based on a fifth transfer function.

In a feasible implementation, an SDR image needs to be converted into an HDR image using this embodiment of the present application. After nonlinear primary color values of all components of each pixel of the SDR image are obtained, electrical-to-optical conversion is performed on the nonlinear primary color values based on an SDR electro-optical transfer function to obtain values of all the components of each pixel of the SDR image.

In a feasible implementation, conversion between HDR images needs to be implemented using this embodiment of the present application. It may be assumed that the second to-be-processed image is an HDR image obtained through conversion using a second transfer curve defined in a second standard. In this embodiment of the present application, the second to-be-processed image is also referred to as an image that complies with the second standard. Therefore, in this step, the fifth transfer function is the second transfer curve defined in the second standard. To be specific, the nonlinear primary color values of all the components of each pixel of the second target image are converted into the linear primary color values of all the components of the corresponding pixel of the second target image based on the fifth transfer curve. For example, it may be assumed that the second target image is data in an HLG domain such that nonlinear primary color values of the pixel of the second target image in the HLG domain are converted into linear primary color values of the pixel of the second target image using an HLG transfer curve. It should be understood that, a transfer curve defined in a high dynamic range image standard includes, but is not limited to, a PQ transfer curve, an SLF transfer curve, or the HLG transfer curve. This is not limited.

In another Embodiment 16 of the present application, after step 611 in Embodiment 15, the method further includes the following step.

Step 712: Determine whether a color space of a display device for the second to-be-processed image is the same as a color space of the first to-be-processed image.

If the color space of the display device for the second to-be-processed image is not the same as the color space of the first to-be-processed image, the color space of the first to-be-processed image is converted into the color space of the display device for the second to-be-processed image.

For example, if the color space of the first to-be-processed image is a BT.709 color space, and the color space of the display device for the second to-be-processed image is a BT.2020 color space, the BT.709 color space is converted into the BT.2020 color space, and then step 510 in Embodiment 14 is performed.

In this embodiment of the present application, consistency between a display effect of the target image and a display effect of the first to-be-processed image can be effectively ensured after the dynamic range is adjusted, and a probability of occurrence of problems such as a contrast change and a detail loss is reduced, thereby reducing impact on the display effect of the image.

In another Embodiment 17 of the present application, linear primary color values of a pixel of an input HDR image are converted into nonlinear primary color values.

For example, an input HDR signal source includes an HDR image data input in a linear floating-point or semi-floating-point EXR format, an HDR image data input collected through PQ or Slog-3 (a collection mode), and an SLF HDR image data input.

For example, conversion from linear primary color values (R, G, B) into nonlinear primary color values (R', G', B') in the PQ domain complies with the following formulas:

$$R' = \text{PQ\_TF}(\max(0, \min(R/10000, 1)));$$

$$G' = \text{PQ\_TF}(\max(0, \min(G/10000, 1))); \text{ and}$$

$$B' = \text{PQ\_TF}(\max(0, \min(B/10000, 1))), \text{ where}$$

$$\text{PQ\_TF}(L) = \left(\frac{c_1 + c_2 L^{m_1}}{1 + c_3 L^{m_1}}\right)^{m_2};$$

$$m_1 = \frac{2610}{4096} \times \frac{1}{4} = 0.1593017578125;$$

$$m_2 = \frac{2523}{4096} \times 128 = 78.84375;$$

$$c_1 = c_3 - c_2 + 1 = \frac{3424}{4096} = 0.8359375$$

$$c_2 = \frac{2413}{4092} \times 32 = 18.8515625; \text{ and}$$

$$c_3 = \frac{2392}{4096} \times 32 = 18.6875.$$

For example, conversion from linear primary color values (R, G, B) into nonlinear primary color values (R', G', B') in an SLF domain complies with the following formulas:

$$R' = \text{SLF\_TF}(\max(0, \min(R/10000, 1)));$$

$$G' = \text{SLF\_TF}(\max(0, \min(G/10000, 1))); \text{ and}$$

$$B' = \text{SLF\_TF}(\max(0, \min(B/10000, 1))), \text{ where}$$

$$\text{SLF\_TF}(L_C) = a \times \left(\frac{p \times L_C}{(p-1) \times L_C + 1.0}\right)^m + b;$$

$$m = 0.14;$$

$$p = 2.3;$$

$$a = 1.12762; \text{ and}$$

$$b = -0.12762;$$

In another Embodiment 18 of the present application, nonlinear primary color values of a pixel of an input HDR image are converted into linear primary color values.

For example, an input HDR signal source includes an HDR image data input in a linear floating-point or semi-floating-point EXR format, an HDR image data input collected through PQ or Slog-3 (a collection mode), and an SLF HDR image data input.

For example, conversion from nonlinear primary color values in an Slog-3 domain into nonlinear primary color values in an SLF domain includes the following steps.

Step 801: Convert HDR nonlinear primary color values in the Slog-3 domain into HDR linear primary color values.

If in>=171.2102946929/1023.0;

out=(10.0^((in*1023.0−420.0)/261.5))*(0.18+0.01)−0.01;

else out=(in*1023.0−95.0)*0.01125000/(171.2102946929−95.0), where in is an input value, and out is an output value.

Step 802: Convert the HDR linear primary color values into SLF nonlinear primary color values according to the method in Embodiment 17.

For example, conversion from nonlinear primary color values in the PQ domain into nonlinear primary color values in the SLF domain includes the following steps.

Step 901: Convert HDR nonlinear primary color values (R, G, B) in the PQ domain into HDR linear primary color values (R', G', B'):

$$R = 10000 * \text{inversePQ\_TF}(R');$$

$$G = 10000 * \text{inversePQ\_TF}(G'); \text{ and}$$

$$B = 10000 * \text{inversePQ\_TF}(B'), \text{ where}$$

$$\text{inversePQ\_TF}(N) = \left(\frac{\max[(N^{1/m_2} - c_1)0]}{c_2 - c_3 N^{1/m_2}}\right)^{1/m_1};$$

$$m_1 = \frac{2610}{4096} \times \frac{1}{4} = 0.1593017578125;$$

$$m_2 = \frac{2523}{4096} \times 128 = 78.84375;$$

$$c_1 = c_3 - c_2 + 1 = \frac{3424}{4096} = 0.8359375;$$

$$c_2 = \frac{2413}{4092} \times 32 = 18.8515625; \text{ and}$$

$$c_3 = \frac{2392}{4096} \times 32 = 18.6875.$$

Step 902: Convert the HDR linear primary color values (R, G, B) into the HDR nonlinear primary color values (R', G', B') in the SLF domain.

For example, conversion from nonlinear primary color values in the SLF domain into linear primary color values includes:

$$R = 10000 * \text{inverseSLF\_TF}(R');$$

$$G = 10000 * \text{inverseSLF\_TF}(G'); \text{ and}$$

$$B = 10000 * \text{inverseSLF\_TF}(B'), \text{ where}$$

$$\text{inverseSLF\_TF}(E') = \frac{1}{p \times \left(\frac{E' - b}{a}\right)^{-\frac{1}{m}} - p + 1.0};$$

$$m = 0.14;$$

$$p = 2.3;$$

$$a = 1.12762; \text{ and}$$

$$b = -0.12762.$$

In another Embodiment 19 of the present application, an adjustment for compatible display of HDR nonlinear primary color values on an SDR device is implemented, and includes processing, by an SDR display compatibility module, the HDR nonlinear primary color values, to obtain SDR nonlinear primary color values, to ensure that the SDR nonlinear primary color values can be correctly displayed on the SDR device. The display compatibility module may include a dynamic range adjustment, a color adjustment, nonlinear-to-linear conversion, and ITU-R BT.1886 EOTF inverse conversion.

Further, dynamic range adjustment of the SDR display compatibility module includes, for dynamic range adjustment processing, adjusting a dynamic range for input HDR nonlinear signals R', G', and B' based on dynamic metadata, to obtain R1, G1, and B1 signals having a suitable SDR dynamic range. In this embodiment of the present application, a dynamic range adjustment curve is generated based on the dynamic metadata, a maximum value in HDR nonlinear signals is used as a reference value, and the dynamic range is adjusted for the reference value, and a ratio between the reference value used before the adjustment and the reference value used after the adjustment is calculated as an adjustment coefficient c, and the adjustment coefficient is applied to the HDR nonlinear signals.

A curve dynamic range adjustment parameter achieves a function of adjusting the dynamic range for the HDR nonlinear signals. The HDR nonlinear signal includes, but is not limited to, an HDR nonlinear signal in the SLF domain, an HDR nonlinear signal in the PQ domain, and the like. A specific expression form of a dynamic range adjustment parameter in the SLF domain is slightly different from that of a dynamic range adjustment parameter in the PQ domain. Because there is a good correspondence between an HDR nonlinear signal in the SLF domain and an HDR nonlinear signal in the PQ domain, the dynamic range adjustment parameter in the PQ domain that corresponds to the dynamic range adjustment parameter in the SLF domain can be easily deduced from the dynamic range adjustment parameter in the SLF domain. In this embodiment of the present application, a formula corresponding to a dynamic range adjustment curve in the SLF domain is as follows:

$$L' = a * \left( \frac{p*L}{(p-1)*L} \right)^m + b,$$

where the parameters p and m are used to control a shape and a curvature of the curve and are generated based on dynamic metadata, the parameters a and b are used to control a range of the curve, to be specific, positions of a start point and an end point, and there are piecewise linear correspondences between the parameter p and an average value y in image dynamic metadata, and correspondences between piecewise key points are shown in the following table.

TABLE 13

| Average value y | 0.1 | 0.25 | 0.3 | 0.55 | 0.6 |
|---|---|---|---|---|---|
| Parameter P | 6.0 | 5.0 | 4.5 | 4.0 | 3.2 |

When the average value y is greater than 0.6, the parameter p is set to 3.2. When the average value is less than 0.1, the parameter p is set to 6.0. When the average value falls within a range between two adjacent items in the table, the parameter p may be obtained through linear interpolation.

For example, when the average value falls within a range between 0.55 and 0.6, the parameter p may be obtained through linear interpolation as follows:

$$p=4.0+(y-0.55)/(0.6-0.55)*(3.2-4.0)$$

The parameter m is a Gamma value of an output SDR display device, and is usually 2.4.

The parameters a and b may be obtained through calculation by solving the following system of equations:

$$L'_1 = a * \left( \frac{p*L_1}{(p-1)*L_1+1} \right)^m + b; \text{ and}$$

$$L'_2 = a * \left( \frac{p*L_2}{(p-1)*L_2+1} \right)^m + b,$$

where $L_1$ is a nonlinear reference maximum value of an HDR image, $L_2$ is a nonlinear reference minimum value of the HDR image, $L_1'$ is a nonlinear reference maximum value of an SDR image, $L_2'$ is a nonlinear reference minimum value of the SDR image, and $L_1$ and $L_2$ are obtained through calculation using the average value Y and a standard deviation V in the dynamic metadata.

There are piecewise linear correspondences between $L_1$ and Y+V, and correspondences between piecewise key points are shown in the following table.

TABLE 14

| Sum of the average value and the standard deviation | 0.2 | 0.5 | 0.7 |
|---|---|---|---|
| Maximum reference value of the HDR image in the SLF domain | 0.85 | 0.9 | 0.92 |

When Y+V is greater than 0.7, $L_1$ is set to 0.92. When Y+V is less than 0.2, $L_1$ is set to 0.85. When Y+V falls within a range between two adjacent pieces of data in the table, $L_1$ may be obtained through linear interpolation.

There are piecewise linear correspondences between $L_2$ and Y−V, and correspondences between piecewise key points are shown in the following table.

TABLE 15

| Difference between the average value and the standard deviation | 0.1 | 0.2 | 0.35 |
|---|---|---|---|
| Minimum value of the HDR image in the SLF domain | 0 | 0.005 | 0.01 |

As shown in Table 15, for example, when Y−V is greater than 0.35, $L_2$ is set to 0.01. When Y−V is less than 0.1, $L_2$ is set to 0. When Y−V falls within a range between two adjacent pieces of data in the table, $L_2$ may be obtained through linear interpolation.

$L_1'$ and $L_2'$ are obtained by performing HDR linear-to-nonlinear conversion on maximum display luminance and minimum display luminance of the output SDR device. For example, maximum display luminance of a common SDR display device is 300 nits, and minimum display luminance is 0.1 nit, and a corresponding nonlinear value $L_1'$ is 0.64, and a corresponding nonlinear value $L_2'$ is 0.12.

Further, the color adjustment of the SDR display compatibility module includes, for the color adjustment, processing, based on the dynamic metadata and the adjustment coefficient c, the HDR nonlinear signals R1, G1, and B1 obtained after the dynamic range is adjusted, to obtain HDR nonlinear signals R2, G2, and B2 after the processing.

An image luminance value Y1 is calculated based on the HDR nonlinear signal values R1, G1, and B1, and for a calculation method, refer to luminance calculation method in Rec.709 and Rec.2020. A color adjustment coefficient Alphy1 is obtained through calculation using the dynamic range adjustment coefficient c, and a calculation formula is a power function, F1 (c)=$c^d$ There are piecewise linear correspondences between the coefficient d and the average value y in the image dynamic metadata, and correspondences between piecewise key points are shown in the following table:

TABLE 16

| Average value | 0.1 | 0.25 | 0.3 | 0.55 | 0.6 |
|---|---|---|---|---|---|
| Coefficient d | 0.15 | 0.18 | 0.2 | 0.22 | 0.25 |

As shown in Table 16, when the average value y is less than 0.1, the coefficient d is set to 0.15. When the average luminance value y is greater than 0.6, the coefficient d is set to 0.25. When the average value y is within a range between two values in the table, the coefficient d may be obtained through calculation through linear interpolation.

Component adjustment coefficients AlphyR, AlphyG, and AlphyB are obtained by respectively processing ratios (namely, Y1/R1, Y1/G1, and Y1/B1) between the luminance value Y1 and the values R1, G1, and B1 using a power function F2, and a formula of the power function F2 is F2(x)=$x^e$. There are piecewise linear correspondences between the coefficient e and the average value y in the image dynamic metadata, and correspondences between piecewise key points are shown in the following table.

TABLE 17

| Average value | 0.1 | 0.25 | 0.3 | 0.55 | 0.6 |
|---|---|---|---|---|---|
| Coefficient e | 1.2 | 1.0 | 0.8 | 0.6 | 0.2 |

As shown in Table 17, when the average value y is less than 0.1, the coefficient e may be set to 1.2. When the average value y is greater than 0.6, the coefficient e may be set to 0.2. When the average value y is within a range between two adjacent pieces of data in the table, the coefficient e may be obtained through linear interpolation.

In another Embodiment 20 of the present application, an adjustment for compatible display of HDR nonlinear primary color values on an HDR device is implemented, and includes performing adaptive display adjustment processing on the HDR nonlinear signals R', G', and B', to obtain HDR nonlinear signals R", G", and B", to ensure that the HDR nonlinear signals can be correctly displayed on different HDR devices. An HDR display compatibility adjustment module includes a dynamic range adjustment and a color adjustment.

Dynamic range adjustment processing uses the method in Embodiment 19, and a difference lies in that, $L_1'$ and $L_2'$ are obtained by performing HDR linear-to-nonlinear conversion on maximum display luminance and minimum display luminance of an output HDR device. The coefficients p and m both need to be obtained by searching the table in Embodiment 19 based on the image dynamic metadata. Entry content needs to be obtained through experimental calibration based on different HDR display devices.

Color range adjustment processing uses the method in Embodiment 19, and a difference lies in that, the coefficients d and e both need to be obtained by searching the table based on the image dynamic metadata. Entry content needs to be obtained through experimental calibration based on different HDR display devices.

Figure 8:
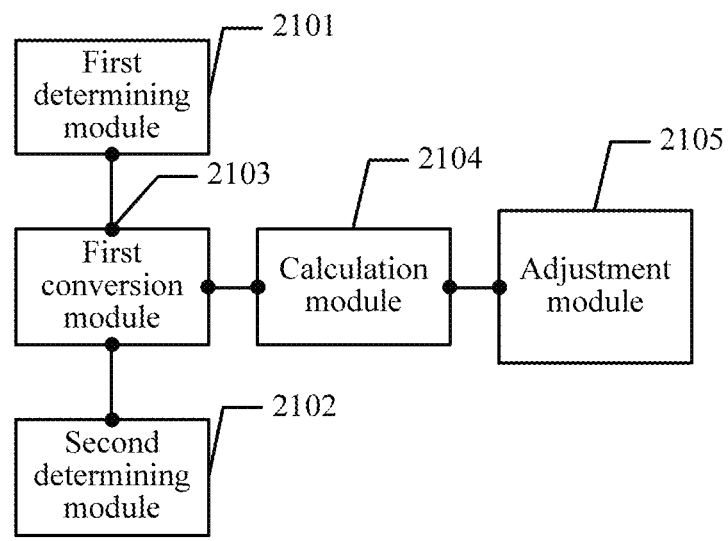
FIG. 8 is a schematic diagram of an embodiment of an image processing apparatus according to the embodiments of the present application.

FIG. 8 is an apparatus block diagram of Embodiment 21 of an image processing apparatus according to the embodiments of the present application. The image processing apparatus includes a first determining module 2101 configured to determine a maximum value in nonlinear primary color values of all components of each pixel of a first to-be-processed image, and perform the methods in step 101 and step 102 in Embodiment 10, where details are not described again, a second determining module 2102 configured to determine dynamic parameters of a first transfer function, and perform the method in step 103 in Embodiment 10, where details are not described again, a first conversion module 2103 configured to convert the maximum value of each pixel into a transfer value based on the first transfer function for which the dynamic parameters are determined, and perform the method in step 104 in Embodiment 10, where details are not described again, a calculation module 2104 configured to calculate a ratio between the transfer value and the maximum value of each pixel, and perform the method in step 105 in Embodiment 10, where details are not described again, and an adjustment module 2105 configured to adjust a dynamic range for the nonlinear primary color values of all the components of each pixel based on the ratio, to obtain nonlinear primary color values of all components of each corresponding pixel of a first target image.

In a feasible implementation, the adjustment module 2105 is further configured to perform an adjustment of narrowing down the dynamic range for the nonlinear primary color values of all the components of each pixel based on the ratio when an image dynamic range of the first to-be-processed image is greater than an image dynamic range of the first target image, and perform an adjustment of expanding the dynamic range for the nonlinear primary color values of all the components of each pixel based on the ratio when an image dynamic range of the first to-be-processed image is less than an image dynamic range of the first target image.

In a feasible implementation, the adjustment module 2105 is further configured to calculate a product of the ratio and each of the nonlinear primary color values of all the components of each pixel to obtain nonlinear primary color values of all the components of each pixel after the adjustment, and perform the method in step 106 in Embodiment 10. Details are not described again.

In a feasible implementation, the component includes an R component, a G component, a B component, or a Y component.

In a feasible implementation, the apparatus further includes a second conversion module (not shown) configured to convert the nonlinear primary color values of all the components of each pixel of the first target image into linear primary color values of all components of a corresponding pixel of a second target image based on a second transfer function, and perform the method in step 207 in Embodiment 11. Details are not described again.

In a feasible implementation, the apparatus further includes a third conversion module (not shown) configured to convert the linear primary color values of all the components of the corresponding pixel of the second target image into nonlinear primary color values of all the components of the corresponding pixel of the second target image based on a third transfer function, and perform the method in step 308 in Embodiment 12. Details are not described again.

In a feasible implementation, the apparatus further includes a fourth conversion module (not shown) configured to convert linear primary color values of all components of each pixel of a second to-be-processed image into nonlinear primary color values of all components of a corresponding pixel of the first to-be-processed image based on a fourth transfer function, and perform the method in step 510 in Embodiment 14. Details are not described again.

In a feasible implementation, the apparatus further includes a fifth conversion module (not shown) configured to convert nonlinear primary color values of all the components of each pixel of the second to-be-processed image into linear primary color values of all the components of the corresponding pixel of the second to-be-processed image based on a fifth transfer function, and perform the method in step 611 in Embodiment 15. Details are not described again.

In a feasible implementation, the first to-be-processed image is a high dynamic range image, and the second target image is a standard dynamic range image, the first transfer function includes an S-shaped transfer curve, the second transfer function includes a high dynamic range electro-optical transfer function, and the third transfer function includes a standard dynamic range optical-electro transfer function.

In a feasible implementation, the second to-be-processed image is a standard dynamic range image, and the first target image is a high dynamic range image, the first transfer function includes a reversed S-shaped transfer curve, the fourth transfer function includes a high dynamic range optical-electro transfer function, and the fifth transfer function includes a standard dynamic range electro-optical transfer function.

In a feasible implementation, the standard dynamic range electro-optical transfer function includes a BT.1886 electro-optical transfer function, and the standard dynamic range optical-electro transfer function includes a BT.1886 optical-electro transfer function.

In a feasible implementation, the first to-be-processed image is a first high dynamic range image, the first target image is a second high dynamic range image, and a dynamic range of the first high dynamic range image is different from a dynamic range of the second high dynamic range image, and the first transfer function includes an S-shaped transfer curve or a reversed S-shaped transfer curve.

In a feasible implementation, the second target image is a third high dynamic range image, and a high dynamic image standard with which the second high dynamic range image complies is different from a high dynamic image standard with which the third high dynamic range image complies, the second transfer function includes a high dynamic range electro-optical transfer function, and the high dynamic range electro-optical transfer function is used to convert an image that conforms to the high dynamic image standard with which the second high dynamic range image complies, and the third transfer function includes a high dynamic range optical-electro transfer function, and the high dynamic range optical-electro transfer function is used to convert an image that conforms to the high dynamic image standard with which the third high dynamic range image complies.

In a feasible implementation, the second to-be-processed image is a fourth high dynamic range image, and a high dynamic image standard with which the first high dynamic range image complies is different from a high dynamic image standard with which the fourth high dynamic range image complies, the fifth transfer function includes a high dynamic range electro-optical transfer function, and the high dynamic range electro-optical transfer function is used to convert an image that conforms to the high dynamic image standard with which the fourth high dynamic range image complies, and the fourth transfer function includes a high dynamic range optical-electro transfer function, and the high dynamic range optical-electro transfer function is used to convert an image that conforms to the high dynamic image standard with which the first high dynamic range image complies.

In a feasible implementation, the high dynamic range electro-optical transfer function includes a PQ electro-optical transfer function, an HLG electro-optical transfer function, or an SLF electro-optical transfer function.

In a feasible implementation, the high dynamic range optical-electro transfer function includes a PQ optical-electro transfer function, an HLG optical-electro transfer function, or an SLF optical-electro transfer function.

In a feasible implementation, the first to-be-processed image belongs to a first to-be-processed image sequence, the first target image belongs to a first target image sequence, and the first conversion module 2103 is further configured to obtain the dynamic parameters based on at least one of the following information of statistics of the first to-be-processed image or statistics of the first to-be-processed image sequence, a first reference value of a range of the first to-be-processed image or a first reference value of a range of the first to-be-processed image sequence, a second reference value of a range of the first to-be-processed image or a second reference value of a range of the first to-be-processed image sequence, a first reference value of a range of the first target image or a first reference value of a range of the first target image sequence, or a second reference value of a range of the first target image or a second reference value of a range of the first target image sequence.

In a feasible implementation, the statistics of the first to-be-processed image or the statistics of the first to-be-processed image sequence includes at least one of the following information of a maximum value, a minimum value, an average value, a standard deviation, and histogram distribution information of a nonlinear primary color value or a linear primary color value of at least one component of a pixel of the first to-be-processed image or the first to-be-processed image sequence.

In a feasible implementation, the first reference value of the range of the first to-be-processed image or the first reference value of the range of the first to-be-processed image sequence includes a maximum luminance value of a display device configured to display the first to-be-processed image, a first list lookup value obtained by searching a first preset list based on the statistics of the first to-be-processed image or the statistics of the first to-be-processed image sequence, or a first preset value.

In a feasible implementation, the second reference value of the range of the first to-be-processed image or the second reference value of the range of the first to-be-processed image sequence includes a minimum luminance value of a display device configured to display the first to-be-processed image, a second list lookup value obtained by searching a second preset list based on the statistics of the first to-be-processed image or the statistics of the first to-be-processed image sequence, or a second preset value.

In a feasible implementation, the first reference value of the range of the first target image or the first reference value of the range of the first target image sequence includes a maximum luminance value of a display device configured to display the first target image, or a third preset value.

In a feasible implementation, the second reference value of the range of the first target image or the second reference value of the range of the first target image sequence includes a minimum luminance value of a display device configured to display the first target image, or a fourth preset value.

In a feasible implementation, the S-shaped transfer curve is a curve whose slope increases initially and then decreases.

In a feasible implementation, the S-shaped transfer curve includes one or more sections of curves.

In a feasible implementation, a form of the S-shaped transfer curve is as follows:

$$L' = a * \left(\frac{p*L}{(p-1)*L}\right)^m + b,$$

where L is the maximum value in the nonlinear primary color values of all the components of each pixel of the first to-be-processed image, L' is the transfer value, and the parameters a, b, p, and m are dynamic parameters of the S-shaped transfer curve.

In a feasible implementation, the parameters p and m are obtained by searching a third preset list based on statistics of the first to-be-processed image or statistics of an image sequence to which the first to-be-processed image belongs, and the parameters a and b are obtained through calculation using the following formulas:

$$L'_1 = a * \left(\frac{p*L_1}{(p-1)*L_1+1}\right)^m + b; \text{ and}$$

$$L'_2 = a * \left(\frac{p*L_2}{(p-1)*L_2+1}\right)^m + b,$$

where $L_1$ is a first reference value of a range of the first to-be-processed image or a first reference value of a range of the image sequence to which the first to-be-processed image belongs, $L_2$ is a second reference value of the range of the first to-be-processed image or a second reference value of the range of the image sequence to which the first to-be-processed image belongs, $L'_1$ is a first reference value of a range of the first target image or a first reference value of a range of a first target image sequence, and $L'_2$ is a second reference value of the range of the first target image or a second reference value of the range of the first target image sequence.

In a feasible implementation, a form of the S-shaped transfer curve consists of the following two functions, when $L_0 \le L \le L_1$, a value of L' is calculated using the following formula:

$$L' = (2t^3-3t^2+1)L'_0 + (t^3-2t^2+t)(L_1-L_0)k_0 + (-2t^3+3t^2)L'_1 + (t^3-t^2)(L_1-L_0)k_1,$$

where $$t = \frac{L-L_0}{L_1-L_0},$$

and when $L_1 < L \le L_2$, a value of L' is calculated using the following formula:

$$L' = (2t^3-3t^2+1)L'_1 + (t^3-2t^2+t)(L_2-L_1)k_1 + (-2t^3+3t^2)L'_2 + (t^3-t^2)(L_2-L_1)k_2,$$

where $$t = \frac{L-L_1}{L_2-L_1},$$

L is the maximum value in the nonlinear primary color values of all the components of each pixel of the first to-be-processed image, and L' is the transfer value, and $L_0$, $L_1$, $L_2$, $L'_0$, $L'_1$, $L'_2$, $k_0$, $k_1$, and $k_2$ are dynamic parameters of the S-shaped transfer curve, $L_0$, $L'_0$, and $k_0$ respectively indicate an input value, an output value, and a slope of a start point of a first section of curve, $L_1$, $L'_1$, and $k_1$ respectively indicate an input value, an output value, and a slope of a connection point between the first section of curve and a second section of curve, $L_2$, $L'_2$, and $k_2$ respectively indicate an input value, an output value, and a slope of an end point of the second section of curve, and $k_0$, $k_0$, and $k_2$ satisfy that $k_0 < k_1$ and $k_1 > k_2$.

In a feasible implementation, $L_0$ is a first reference value of a range of the first to-be-processed image or a first reference value of a range of a first to-be-processed image sequence, $L_2$ is a second reference value of the range of the first to-be-processed image or a second reference value of the range of the first to-be-processed image sequence, $L'_0$ is a first reference value of a range of the first target image or a first reference value of a range of a first target image sequence, and $L'_2$ is a second reference value of the range of the first target image or a second reference value of the range of the first target image sequence, and the parameters $L_1$, $L'_1$, $k_0$, $k_1$, and $k_2$ are obtained by searching a fourth preset list based on statistics of the first to-be-processed image or statistics of the first to-be-processed image sequence.

In a feasible implementation, $L_0$ is a first reference value of a range of the first to-be-processed image or a first reference value of a range of a first to-be-processed image sequence, $L_2$ is a second reference value of the range of the first to-be-processed image or a second reference value of the range of the first to-be-processed image sequence, $L'_0$ is a first reference value of a range of the first target image or a first reference value of a range of a first target image sequence, and $L'_2$ is a second reference value of the range of the first target image or a second reference value of the range of the first target image sequence, the parameters $L_1$, $k_0$, $k_1$, and $k_2$ are obtained by searching a fifth preset list based on statistics of the first to-be-processed image or statistics of the first to-be-processed image sequence, and the parameter $L'_1$ is obtained through calculation using the following formula:

$$L'_1 = \sqrt{L_1 \times \sqrt{L'_0 \times L'_2}}.$$

In a feasible implementation, the reversed S-shaped transfer curve is a curve whose slope decreases initially and then increases.

In a feasible implementation, the reversed S-shaped transfer curve includes one or more sections of curves.

In a feasible implementation, a form of the reversed S-shaped transfer curve is as follows:

$$L' = \frac{1}{p \times \left(\frac{L-b}{a}\right)^{-\frac{1}{m}} - p + 1},$$

where L is the maximum value in the nonlinear primary color values of all the components of each pixel of the first to-be-processed image, L' is the transfer value, and the parameters a, b, p, and m are dynamic parameters of the reversed S-shaped transfer curve.

In a feasible implementation, the parameters p and m are obtained by searching a sixth preset list, and the parameters a and b are calculated using the following formulas:

$$L'_1 = \frac{1}{p \times \left(\frac{L_1 - b}{a}\right)^{-\frac{1}{m}} - p + 1}; \text{ and}$$

$$L'_2 = \frac{1}{p \times \left(\frac{L_2 - b}{a}\right)^{-\frac{1}{m}} - p + 1},$$

where $L_1$ is a first reference value of a range of the first to-be-processed image or a first reference value of a range of the image sequence to which the first to-be-processed image belongs, $L_2$ is a second reference value of the range of the first to-be-processed image or a second reference value of the range of the image sequence to which the first to-be-processed image belongs, $L'_1$ is a first reference value of a range of the first target image or a first reference value of a range of a first target image sequence, and $L'_2$ is a second reference value of the range of the first target image or a second reference value of the range of the first target image sequence.

In a feasible implementation, a form of the reversed S-shaped transfer curve consists of the following two functions, when $L_0 \leq L \leq L_1$, a value of L' is calculated using the following formula:

$$L' = (2t^3 - 3t^2 + 1)L'_0 + (t^3 - 2t^2 + t)(L_1 - L_0)k_0 + (-2t^3 + 3t^2)L'_1 + (t^3 - t^2)(L_1 - L_0)k_1,$$

where $$t = \frac{L - L_0}{L_1 - L_0},$$

when $L_1 < L \leq L_2$ a value of L' is calculated using the following formula:

$$L' = (2t^3 - 3t^2 + 1)L'_1 + (t^3 - 2t^2 + t)(L_2 - L_1)k_1 + (-2t^3 + 3t^2)L'_2 + (t^3 - t^2)(L_2 - L_1)k_2,$$

where $$t = \frac{L - L_1}{L_2 - L_1},$$

L is the maximum value in the nonlinear primary color values of all the components of each pixel of the first to-be-processed image, and L' is the transfer value, and $L_0$, $L_1$, $L_2$, $L'_0$, $L'_1$, $L'_2$, $k_0$, $k_1$, and $k_2$ are dynamic parameters of the S-shaped transfer curve, $L_0$, $L'_0$, and $k_0$ respectively indicate an input value, an output value, and a slope of a start point of a first section of curve, $L_1$, $L'_1$, and $k_1$ respectively indicate an input value, an output value, and a slope of a connection point between the first section of curve and a second section of curve, $L_2$, $L'_2$, and $k_2$ respectively indicate an input value, an output value, and a slope of an end point of the second section of curve, and $k_0$, $k_1$, and $k_2$ satisfy that $k_0 > k_1$ and $k_1 < k_2$.

In a feasible implementation, $L_0$ is a first reference value of a range of the first to-be-processed image or a first reference value of a range of a first to-be-processed image sequence, $L_2$ is a second reference value of the range of the first to-be-processed image or a second reference value of the range of the first to-be-processed image sequence, $L'_0$ is a first reference value of a range of the first target image or a first reference value of a range of a first target image sequence, and $L'_2$ is a second reference value of the range of the first target image or a second reference value of the range of the first target image sequence, and the parameters $L_1$, $L'_1$, $k_0$, $k_1$, and $k_2$ are obtained by searching a seventh preset list based on statistics of the first to-be-processed image or statistics of the first to-be-processed image sequence.

In a feasible implementation, $L_0$ is a first reference value of a range of the first to-be-processed image or a first reference value of a range of a first to-be-processed image sequence, $L_2$ is a second reference value of the range of the first to-be-processed image or a second reference value of the range of the first to-be-processed image sequence, $L'_0$ is a first reference value of a range of the first target image or a first reference value of a range of a first target image sequence, and $L'_2$ is a second reference value of the range of the first target image or a second reference value of the range of the first target image sequence, the parameters $L_1$, $k_0$, $k_1$, and $k_2$ are obtained by searching an eighth preset list based on statistics of the first to-be-processed image or statistics of the first to-be-processed image sequence, and the parameter $L'_1$ is obtained through calculation using the following formula:

$$L'_1 = \sqrt{L_1 \times \sqrt{L'_0 \times L'_2}}.$$

It should be understood that, solutions in the foregoing feasible implementations of the apparatus are consistent with the solutions in the feasible implementations of the method in Embodiment 10, and details are not described again.

In this embodiment of the present application, consistency between a display effect of the target image and a display effect of the first to-be-processed image can be effectively ensured after the dynamic range is adjusted, and a probability of occurrence of problems such as a contrast change and a detail loss is reduced, thereby reducing impact on the display effect of the image.

Figure 9:
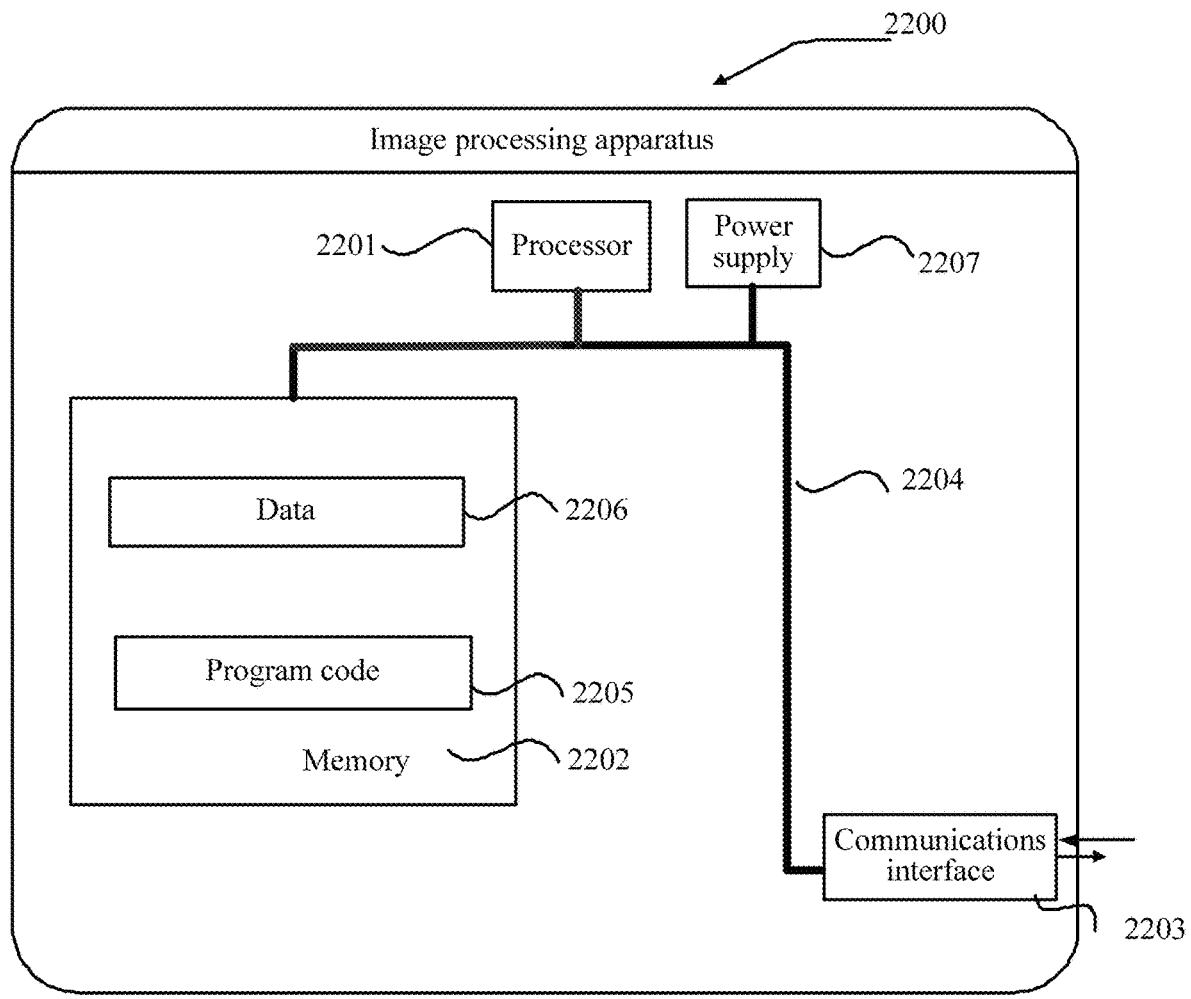
FIG. 9 is a schematic diagram of another embodiment of an image processing apparatus according to the embodiments of the present application.

The image processing apparatus in this embodiment of this application is described above from a perspective of modular functional entities. The image processing apparatus in this embodiment of this application is described below from a perspective of hardware processing. As shown in FIG. 9, for ease of description, only parts related to the embodiments of this application are shown, and for specific technical details that are not disclosed, refer to the corresponding method part in the embodiments of this application. Referring to FIG. 9, FIG. 9 is a schematic structural diagram of another Embodiment 22 of an image processing apparatus 2200 according to the embodiments of this application. The image processing apparatus 2200 includes a processor 2201, a memory 2202, and a communications interface 2203. The processor 2201, the memory 2202, and the communications interface 2203 are connected using a bus 2204.

The image processing apparatus 2200 may vary greatly due to different configurations or performance, for example, may include one or more processors 2201 and memories 2202 configured to store program code 2205 and data 2206. When the program code 2205 is executed by the processor 2201, Embodiment 1 of this application or the method described in Embodiment 1 can be implemented. Persons skilled in the art may understand that a structure of a terminal device shown in FIG. 9 does not constitute a limitation to the terminal device, and the terminal device may include more components or fewer components than those shown in the figure, or some components may be combined, or a different component deployment may be used. This is not limited in this application.

It should be understood that, the processor 2201 used in the foregoing apparatus embodiment may be a central processing unit (CPU), a network processor (NP), or a combination of a CPU and an NP. The processor 2201 may further include a hardware chip that may include an application-specific integrated circuit (ASIC), a programmable logic device (PLD), or a combination thereof. In addition, the PLD may be a complex PLD (CPLD), a field-programmable gate array (FPGA), a generic array logic (GAL), or any combination thereof. This is not limited in this embodiment of the present application. The processor 2201 is configured to perform the steps in Method Embodiment 10 to Method Embodiment 20. For details, refer to the descriptions in Method Embodiment 10 to Method Embodiment 20, and details are not described herein again.

The memory 2202 may include a volatile memory, for example, a random access memory (RAM). The memory 2202 may alternatively include a non-volatile memory, for example, a flash memory, a hard disk drive (HDD), or a solid-state drive (SSD). The memory 2202 may alternatively include a combination of the foregoing types of memories. The memory 2202 is configured to store data or information used when the image processing apparatus 2200 is configured to perform the method described in Embodiment 1 or Embodiment 2, for example, is configured to store information such as the dynamic parameters of the first transfer function, and is configured to store the data 2206 such as the first to-be-processed image or the first to-be-processed image sequence, and the first target image or the first target image sequence.

The communications interface 2203 is configured to communicate with an external device.

The bus 2204 may be a peripheral component interconnect (PCI) bus, an extended industry standard architecture (EISA) bus, or the like. The bus 2204 may be further classified into an address bus, a data bus, a control bus, and the like. For ease of representation, only one bold line is used to represent the bus 2204 in FIG. 9, but this does not mean that there is only one bus or one type of bus.

It should be understood that, the image processing apparatus 2200 may further include one or more power supplies 2207. For functions, steps, or more details of the image processing apparatus 2200, correspondingly refer to the descriptions in Method Embodiment 10 to Method Embodiment 20, and details are not described herein again.

In the several embodiments provided in this application, it should be understood that the disclosed system, module, and method may be implemented in other manners. For example, the described apparatus embodiment is merely an example. For example, the module division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional modules in the embodiments of the present application may be integrated into one processing unit, or each of the units may exist alone physically, or two or more units are integrated into one unit. The integrated unit may be implemented in a form of hardware, or may be implemented in a form of a software functional unit. When the integrated module is implemented in the form of a software functional unit and sold or used as an independent product, the integrated module may be stored in a computer-readable storage medium. Based on such an understanding, the technical solutions of the present application essentially, or the part contributing to the other approaches, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of the present application. The foregoing storage medium includes any medium that can store program code, such as a USB flash drive, a removable hard disk, a read-only memory, a random access memory, a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present application.

What is claimed is:

1. An image processing method, comprising:
    determining a maximum value in nonlinear primary color values of all components of each pixel of a first to-be-processed image;
    determining dynamic parameters of a first transfer function comprising a reversed S-shaped transfer curve, wherein a form of the reversed S-shaped transfer curve is as follows:

$$L' = \frac{1}{p \times \left(\frac{L-b}{a}\right)^{-\frac{1}{m}} - p + 1},$$

wherein the L is the maximum value in the nonlinear primary color values of all the components of each pixel of the first to-be-processed image, wherein the L' is the transfer value, and wherein parameters the a, the b, the p, and the m are dynamic parameters of the reversed S-shaped transfer curve;
    converting the maximum value of each pixel into a transfer value based on the first transfer function for which the dynamic parameters are determined;
    calculating a ratio between the transfer value and the maximum value of each pixel; and
    adjusting a dynamic range for the nonlinear primary color values of all the components of each pixel based on the ratio to obtain nonlinear primary color values of all components of each corresponding pixel of a first target image.

2. The image processing method of claim 1, wherein adjusting the dynamic range for the nonlinear primary color values of all the components of each pixel based on the ratio comprises:
performing an adjustment of narrowing down the dynamic range for the nonlinear primary color values of all the components of each pixel based on the ratio when an image dynamic range of the first to-be-processed image is greater than an image dynamic range of the first target image; and
performing an adjustment of expanding the dynamic range for the nonlinear primary color values of all the components of each pixel based on the ratio when the image dynamic range of the first to-be-processed image is less than the image dynamic range of the first target image.

3. The image processing method of claim 1, wherein adjusting the dynamic range for the nonlinear primary color values of all the components of each pixel based on the ratio comprises calculating a product of the ratio and each of the nonlinear primary color values of all the components of each pixel to obtain nonlinear primary color values of all the components of each pixel after the adjustment.

4. The image processing method of claim 1, wherein after obtaining the nonlinear primary color values of all the components of each corresponding pixel of the first target image, the method further comprises converting the nonlinear primary color values of all the components of each pixel of the first target image into linear primary color values of all components of a corresponding pixel of a second target image based on a second transfer function.

5. The image processing method of claim 4, wherein after converting the nonlinear primary color values of all the components of each pixel of the first target image into the linear primary color values of all the components of the corresponding pixel of the second target image, the method further comprises converting the linear primary color values of all the components of the corresponding pixel of the second target image into nonlinear primary color values of all the components of the corresponding pixel of the second target image based on a third transfer function.

6. The image processing method of claim 1, wherein before determining the maximum value in the nonlinear primary color values of all the components of each pixel of the first to-be-processed image, the method further comprises converting linear primary color values of all components of each pixel of a second to-be-processed image into nonlinear primary color values of all components of a corresponding pixel of the first to-be-processed image based on a fourth transfer function.

7. The image processing method of claim 6, wherein before converting the linear primary color values of all the components of each pixel of the second to-be-processed image into the nonlinear primary color values of all the components of the corresponding pixel of the first to-be-processed image, the method further comprises converting nonlinear primary color values of all the components of each pixel of the second to-be-processed image into linear primary color values of all components of a corresponding pixel of the second to-be-processed image based on a fifth transfer function.

8. The image processing method of claim 5, wherein the first to-be-processed image is a high dynamic range image, wherein the second target image is a standard dynamic range image, wherein the second transfer function comprises a high dynamic range electro-optical transfer function, and wherein the third transfer function comprises a standard dynamic range optical-electro transfer function.

9. The image processing method of claim 7, wherein the second to-be-processed image is a standard dynamic range image, wherein the first target image is a high dynamic range image, wherein the fourth transfer function comprises a high dynamic range optical-electro transfer function, and wherein the fifth transfer function comprises a standard dynamic range electro-optical transfer function.

10. The image processing method of claim 1, wherein the first to-be-processed image is a first high dynamic range image, wherein the first target image is a second high dynamic range image, and wherein a dynamic range of the first high dynamic range image is different from a dynamic range of the second high dynamic range image.

11. The image processing method of claim 1, wherein the first to-be-processed image belongs to a first to-be-processed image sequence, wherein the first target image belongs to a first target image sequence, and wherein determining the dynamic parameters of the first transfer function comprises obtaining the dynamic parameters based on at least one of the following information:
statistics of the first to-be-processed image or statistics of the first to-be-processed image sequence;
a first reference value of a range of the first to-be-processed image or a first reference value of a range of the first to-be-processed image sequence;
a second reference value of the range of the first to-be-processed image or a second reference value of the range of the first to-be-processed image sequence;
a first reference value of a range of the first target image or a first reference value of a range of the first target image sequence; or
a second reference value of the range of the first target image or a second reference value of the range of the first target image sequence.

12. The image processing method of claim 1, wherein the first transfer function further comprises an S-shaped transfer curve, and wherein a form of the S-shaped transfer curve is as follows:

$$L' = a * \left(\frac{p * L}{(p-1) * L}\right)^m + b,$$

wherein the L is the maximum value in the nonlinear primary color values of all the components of each pixel of the first to-be-processed image, wherein the L' is the transfer value, and wherein parameters the a, the b, the p, and the m are dynamic parameters of the S-shaped transfer curve.

13. The image processing method of claim 12, wherein the dynamic parameters the p and the m are obtained by searching a first preset list based on statistics of the first to-be-processed image or statistics of an image sequence to which the first to-be-processed image belongs, and wherein the dynamic parameters the a and the b are obtained through calculation using the following formulas:

$$L'_1 = a * \left(\frac{p * L_1}{(p-1) * L_1 + 1}\right)^m + b; \text{ and}$$

-continued $$L'_2 = a * \left(\frac{p * L_2}{(p-1) * L_2 + 1}\right)^m + b,$$

wherein the $L_1$ is a first reference value of a range of the first to-be-processed image or a first reference value of a range of the image sequence to which the first to-be-processed image belongs, wherein the $L_2$ is a second reference value of the range of the first to-be-processed image or a second reference value of the range of the image sequence to which the first to-be-processed image belongs, wherein the $L'_1$ is a first reference value of a range of the first target image or a first reference value of a range of a first target image sequence, and wherein the $L'_2$ is a second reference value of the range of the first target image or a second reference value of the range of the first target image sequence.

14. The image processing method of claim 1, wherein the first transfer function further comprises an S-shaped transfer curve, and wherein a form of the S-shaped transfer curve consists of the following two functions:
a first value of L' is calculated using the following formula:

$$L' = (2t^3 - 3t^2 + 1)L'_0 + (t^3 - 2t^2 + t)(L_1 - L_0)k_0 + (-2t^3 + 3t^2)L'_1 + (t^3 - t^2)(L_1 - L_0)k_1$$

when $L_0 \leq L \leq L_1$, wherein the $$t = \frac{L - L_0}{L_1 - L_0};$$

and
a second value of the L' is calculated using the following formula:

$$L' = (2t^3 - 3t^2 + 1)L'_1 + (t^3 - 2t^2 + t)(L_2 - L_1)k_1 + (-2t^3 + 3t^2)L'_2 + (t^3 - t^2)(L_2 - L_1)k_2$$

when $L_1 < L \leq L_2$, wherein the $$t = \frac{L - L_1}{L_2 - L_1},$$

wherein the L is the maximum value in the nonlinear primary color values of all the components of each pixel of the first to-be-processed image, wherein the L' is the transfer value, wherein the $L_0$, the $L_1$, the $L_2$, the $L'_0$, the $L'_1$, the $L'_2$, the $k_0$, the $k_1$, and the $k_2$ are dynamic parameters of the S-shaped transfer curve, wherein the $L_0$, the $L'_0$, and the $k_0$ respectively indicate an input value, an output value, and a slope of a start point of a first section of curve, wherein the $L_1$, the $L'_1$, and the $k_1$ respectively indicate an input value, an output value, and a slope of a coupling point between the first section of curve and a second section of curve, wherein the $L_2$, the $L'_2$, and the $k_2$ respectively indicate an input value, an output value, and a slope of an end point of the second section of curve, and wherein the $k_0$, the $k_1$, and the $k_2$ satisfy $k_0 < k_1$ and $k_1 > k_2$.

15. The image processing method of claim 14, wherein the $L_0$ is a first reference value of a range of the first to-be-processed image or a first reference value of a range of a first to-be-processed image sequence, wherein the $L_2$ is a second reference value of the range of the first to-be-processed image or a second reference value of the range of the first to-be-processed image sequence, wherein the $L'_0$ is a first reference value of a range of the first target image or a first reference value of a range of a first target image sequence, wherein the $L'_2$ is a second reference value of the range of the first target image or a second reference value of the range of the first target image sequence, and wherein the dynamic parameters the $L_1$, the $L'_1$, the $k_0$, the $k_1$, and the $k_2$ are obtained by searching a second preset list based on statistics of the first to-be-processed image or statistics of the first to-be-processed image sequence.

16. The image processing method of claim 14, wherein the $L_0$ is a first reference value of a range of the first to-be-processed image or a first reference value of a range of a first to-be-processed image sequence, wherein the $L_2$ is a second reference value of the range of the first to-be-processed image or a second reference value of the range of the first to-be-processed image sequence, wherein the $L'_0$ is a first reference value of a range of the first target image or a first reference value of a range of a first target image sequence, wherein the $L'_2$ is a second reference value of the range of the first target image or a second reference value of the range of the first target image sequence, wherein the dynamic parameters the $L_1$, the $k_0$, the $k_1$, and the $k_2$ are obtained by searching a third preset list based on statistics of the first to-be-processed image or statistics of the first to-be-processed image sequence, and wherein the dynamic parameter $L'_1$ is obtained through calculation using the following formula:

$$L'_1 = \sqrt{L_1 \times \sqrt{L'_0 \times L'_2}}.$$

17. The image processing method of claim 1, wherein the dynamic parameters the p and the m are obtained by searching a fourth preset list, and wherein the dynamic parameters the a and the b are calculated using the following formulas:

$$L'_1 = \frac{1}{p \times \left(\frac{L_1 - b}{a}\right)^{-\frac{1}{m}} - p + 1}; \text{ and}$$

$$L'_2 = \frac{1}{p \times \left(\frac{L_2 - b}{a}\right)^{-\frac{1}{m}} - p + 1},$$

wherein the $L_1$ is a first reference value of a range of the first to-be-processed image or a first reference value of a range of the image sequence to which the first to-be-processed image belongs, wherein the $L_2$ is a second reference value of the range of the first to-be-processed image or a second reference value of the range of the image sequence to which the first to-be-processed image belongs, wherein the $L'_1$ is a first reference value of a range of the first target image or a first reference value of a range of a first target image sequence, and wherein the $L'_2$ is a second reference value of the range of the first target image or a second reference value of the range of the first target image sequence.

18. The image processing method of claim 1, wherein the form of the reversed S-shaped transfer curve consists of the following two functions:

a first value of L' is calculated using the following formula:

$$L'=(2t^3-3t^2+1)L'_0+(t^3-2t^2+t)(L_1-L_0)k_0+(-2t^3+3t^2)L'_1+(t^3-t^2)(L_1-L_0)k_1$$

when $L_0 \leq L \leq L_1$, and wherein the $$t = \frac{L-L_0}{L_1-L_0};$$

and a second value of the L' is calculated using the following formula:

$$L'=(2t^3-3t^2+1)L'_1+(t^3-2t^2+t)(L_2-L_1)k_1+(-2t^3+3t^2)L'_2+(t^3-t^2)(L_2-L_1)k_2$$

when $L_1 < L \leq L_2$, wherein the $$t = \frac{L-L_1}{L_2-L_1},$$

wherein the L is the maximum value in the nonlinear primary color values of all the components of each pixel of the first to-be-processed image, wherein the L' is the transfer value, wherein the $L_0$, the $L_1$, the $L_2$, the $L'_0$, the $L'_1$, the $L'_2$, the $k_0$, the $k_1$, and the $k_2$ are dynamic parameters of the reversed S-shaped transfer curve, wherein the $L_0$, the $L'_0$, and $k_0$ respectively indicate an input value, an output value, and a slope of a start point of a first section of curve, wherein the $L_1$, the $L'_1$, and the $k_1$ respectively indicate an input value, an output value, and a slope of a coupling point between the first section of curve and a second section of curve, wherein the $L_2$, the $L'_2$, and the $k_2$ respectively indicate an input value, an output value, and a slope of an end point of the second section of curve, and wherein the $k_0$, the $k_1$, and the $k_2$ satisfy $k_0 > k_1$ and $k_1 < k_2$.

19. An image processing apparatus, comprising:
a memory comprising instructions; and
a processor coupled to the memory, wherein the instructions cause the processor to be configured to:
determine a maximum value in nonlinear primary color values of all components of each pixel of a first to-be-processed image;
determine dynamic parameters of a first transfer function comprising a reversed S-shaped transfer curve, wherein a form of the reversed S-shaped transfer curve is as follows:

$$L' = \frac{1}{p \times \left(\frac{L-b}{a}\right)^{-\frac{1}{m}} - p + 1},$$

wherein the L is the maximum value in the nonlinear primary color values of all the components of each pixel of the first to-be-processed image, wherein the L' is the transfer value, and wherein parameters the a, the b, the p, and the m are dynamic parameters of the reversed S-shaped transfer curve;
convert the maximum value of each pixel into a transfer value based on the first transfer function for which the dynamic parameters are determined;
calculate a ratio between the transfer value and the maximum value of each pixel; and
adjust a dynamic range for the nonlinear primary color values of all the components of each pixel based on the ratio to obtain nonlinear primary color values of all components of each corresponding pixel of a first target image.

20. The image processing apparatus of claim 19, wherein the first to-be-processed image is a high dynamic range image.

* * * * *